United States Patent [19]
Saitoh et al.

[11] Patent Number: 5,357,295
[45] Date of Patent: Oct. 18, 1994

[54] IMAGE PROJECTING APPARATUS PROVIDED WITH CARTRIDGE LOADER

[75] Inventors: Takanori Saitoh, Ebina; Hiroshi Tanimoto, Zama; Jun Nishiseko, Yokohama; Shuichi Saito, Machida, all of Japan

[73] Assignee: Minolta Camera Kabushiki Kaisha, Osaka, Japan

[21] Appl. No.: 144,721

[22] Filed: Oct. 28, 1993

Related U.S. Application Data

[63] Continuation of Ser. No. 943,377, Sep. 10, 1992, abandoned, which is a continuation of Ser. No. 618,059, Nov. 26, 1990, abandoned.

[30] Foreign Application Priority Data

| Nov. 27, 1989 | [JP] | Japan | 1-308125 |
| Nov. 27, 1989 | [JP] | Japan | 1-308126 |
| Sep. 7, 1990 | [JP] | Japan | 2-238795 |
| Sep. 7, 1990 | [JP] | Japan | 2-238796 |

[51] Int. Cl.$^5$ ............................................. G03B 23/12
[52] U.S. Cl. ............................... 353/26 A; 353/26 R
[58] Field of Search ............... 353/26 A, 26 R, 27 A, 353/27 R, 25, 113, DIG. 2, DIG. 5; 352/72, 73, 123; 355/40

[56] References Cited

U.S. PATENT DOCUMENTS

| 3,164,059 | 1/1965 | Turrentine | 353/26 A |
| 3,463,580 | 8/1969 | Freudenschusz et al. | 352/73 |
| 3,722,828 | 3/1973 | Kremp et al. | 242/181 |
| 3,807,074 | 4/1974 | Owens | 40/159 |
| 4,353,642 | 10/1982 | Weigert | 353/25 |
| 4,755,046 | 10/1985 | Hirose et al. | 353/26 R |
| 4,936,677 | 6/1990 | Koumura et al. | 353/26 A |
| 4,938,586 | 7/1990 | Hirose et al. | 353/26 A |
| 4,949,106 | 8/1990 | Igarashi | 353/26 A |
| 5,104,215 | 4/1992 | Furukawa | 353/25 |

FOREIGN PATENT DOCUMENTS 55-39386 9/1980 Japan.
61-130108 6/1986 Japan.

Primary Examiner—William A. Cuchlinski, Jr.
Assistant Examiner—William C. Dowling
Attorney, Agent, or Firm—Willian Brinks Hofer Gilson & Lione

[57] ABSTRACT

An image projecting apparatus for projecting on an image receiving body an image on a microfilm incorporated in a cartridge is disclosed. This apparatus is provided with a cartridge loader for supporting a container for accommodating a plurality of cartridges. The cartridges in the container are disposed toward the cartridge holder provided for the image projecting apparatus to allow search of the microfilms held therein. The cartridges holding microfilms which have undergone the search are discharged from the cartridge holder. When the cartridge loader is adapted to allow attachment thereto of one container, the cartridges are taken out of the container and, after completion of the retrieval, the cartridges are returned to the container. When the cartridge loader is arranged to permit detachable attachment thereto of a first container for accommodating unsearched cartridges and a second container for accommodating searched cartridges, the cartridges which have undergone the search are returned to the second container after the cartridges in the first container have been attached to the cartridge holder and subjected to the search. When the cartridges in the first container are emptied, the first container is located at the position formerly occupied by the second container.

21 Claims, 20 Drawing Sheets

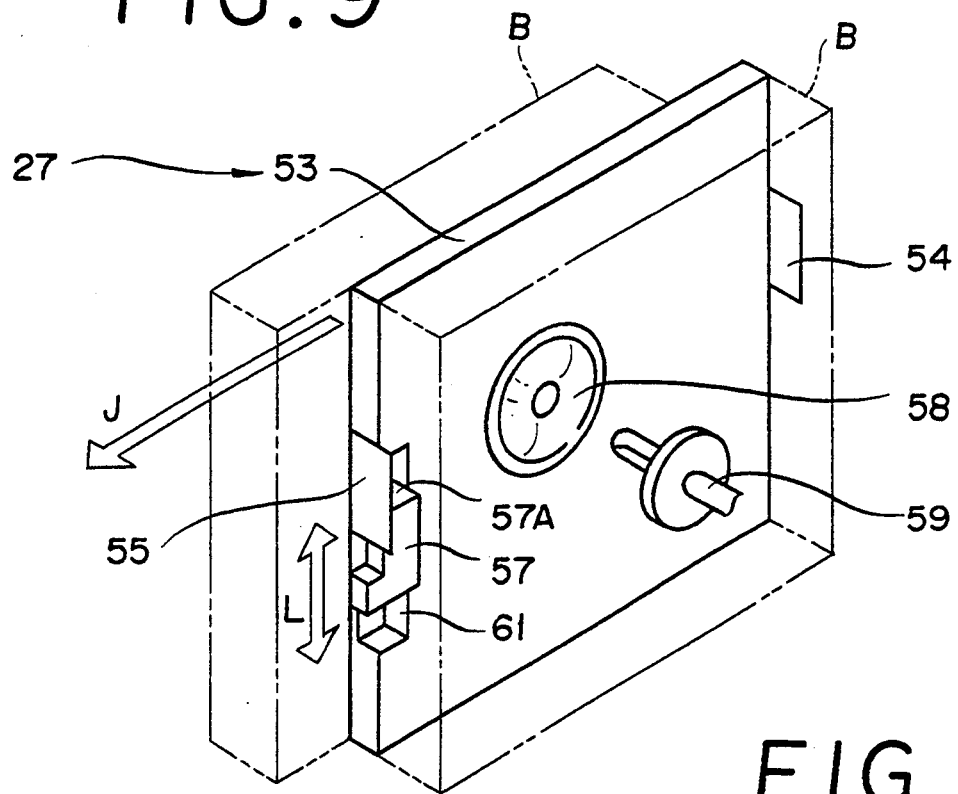
FIG. 9
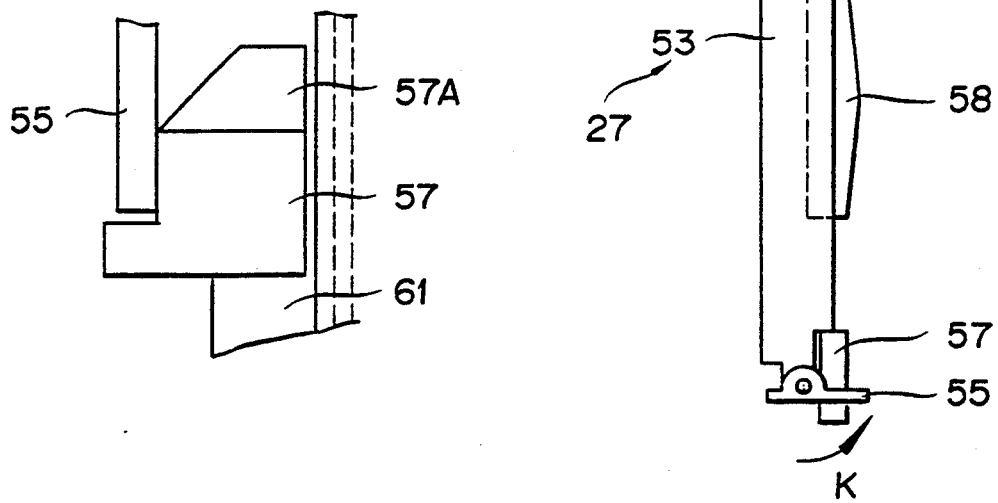
FIG. 10
FIG. 11

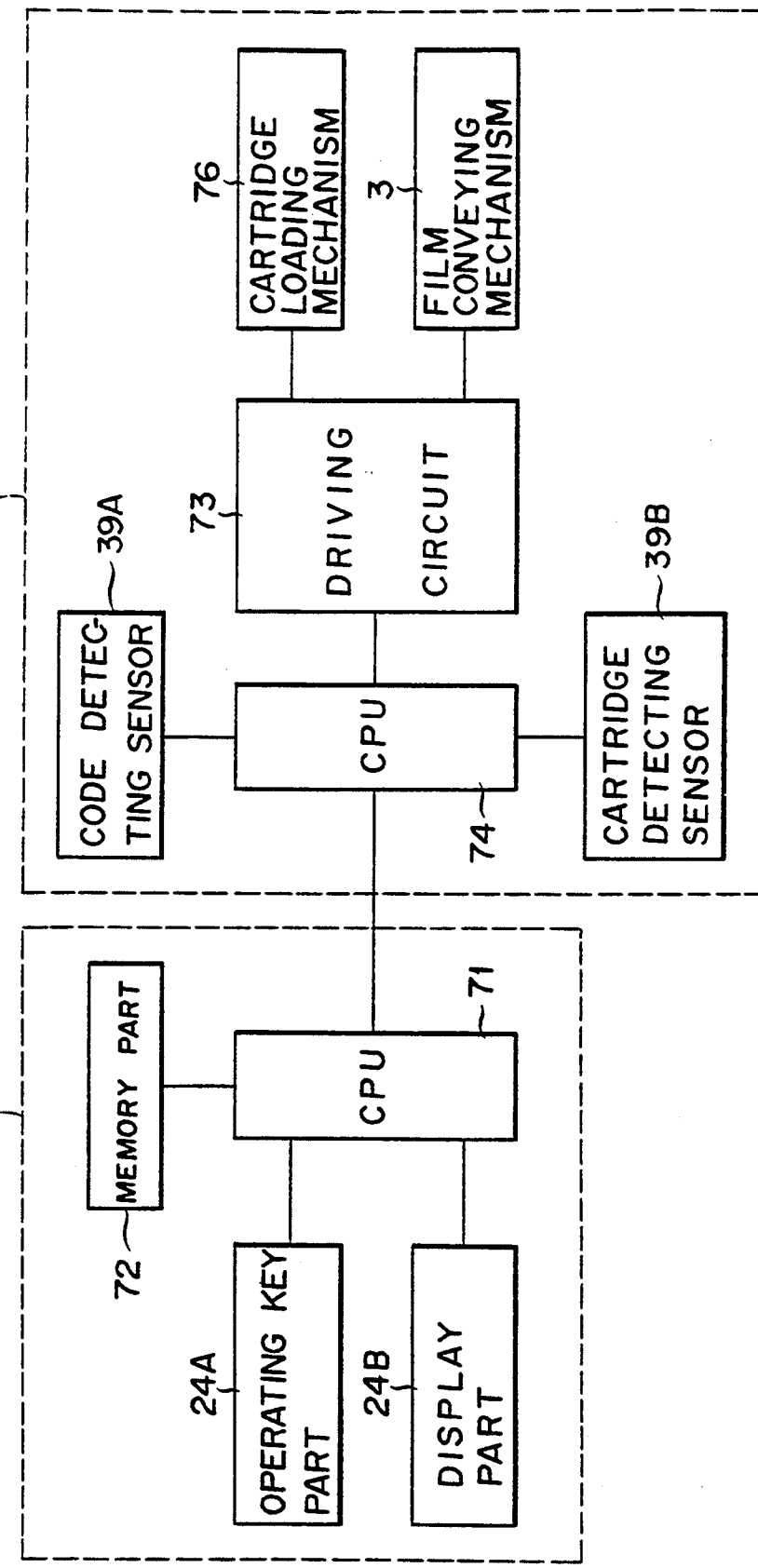

IMAGE PROJECTING APPARATUS PROVIDED WITH CARTRIDGE LOADER

This application is a continuation of application Ser. No. 07/943,377, filed Sep. 10, 1992, now abandoned, which, in turn, is a continuation of application Ser. No. 07/618,059, filed Nov. 26, 1990, now abandoned.

BACKGROUND OF THE INVENTION

1. Field of the Invention

This invention relates to an image projecting apparatus for use as in a reader printer, which apparatus is adapted to be automatically loaded with a cartridge incorporating therein a microfilm. More particularly this invention relates to an image projecting apparatus which automatically retrieves a desired image from the microfilm in the cartridge and projects the retrieved image on a screen or other image receiving body.

2. Description of the Prior Art

A microfilm reader is used for the purpose of enabling an image recorded on a microfilm to be projected in a magnified size on a screen for easy inspection. A microfilm reader/printer is endowed with an image copying function in addition to the image projecting function. A microfilm scanner projects an image in a microfilm on a solid image pickup element as an image receiving body, reads the projected image therefrom, and stores the image information in an electronic recording medium. Where an image recorded on a microfilm is to be copied on a recording paper without being projected on a screen, an exclusively microfilm grade printer endowed only with an image copying function is used.

The microfilm is now used in a great quantity by enterprises specializing as in commodity distribution and finance because it has been granted admissibility as evidence in legal procedures. It is not uncommon for these large-scale users to keep in storage great many rolls of microfilm on the order of some hundred thousands in quantity. In the case of image retrieval, since a desired image must be sought out of such a collossal volume of microfilm as mentioned above, the microfilm system is required to permit highly efficient retrieval.

A large-scale user keeping in storage such a large volume of microfilm as this makes the practice of carrying out the retrieval of a necessary image as follows.

First, a written instruction designating the cartridge number, frame number, etc. of a particular microfilm roll subjected to retrieval is issued as an output from a computer. Then, in accordance with this written instruction, the designated cartridge is manually taken out of a storage shell holding such an immense volume of microfilm as some hundred thousands of rolls. Usually, a small unit of about ten cartridges is placed in conjunction with the written instruction in a carrier box. This carrier box is transported to an operator tending an image projecting device such as a reader printer. Then, the operator extracts necessary cartridges one by one from the carrier box by consulting the written instruction, manually sets a selected cartridge in place in the image projecting device as a reader printer, and performs retrieval and reproduction of the image of a desired frame number. Thereafter, the cartridge which has undergone the image retrieval is manually removed from the image projecting device, returned to the carrier box, and replaced at the prescribed position in the storage shelf. Finally, the recording papers on which the image has been copied are distributed to pertinent sections of the firm.

In the conventional system, since all of the works of image retrieval except for those of searching and copying are manually carried out, it has been extremely difficult for the operation of searching to be improved any further in efficiency and economy of labor.

For the purpose of solving the problem of the nature described above, the idea of using the device disclosed in Japanese Patent Laid-Open No. 61-130,108, namely such a device as a cartridge changer or a cartridge loader, has been conceived. The device of this kind cannot be employed in its unmodified form for the aforementioned large-scale user. To be specific, if this device is employed for the large-scale user, it inevitably entails numerous demerits such as an unwanted increase in the size and cost of equipment, an addition to the access time for extraction of the desired cartridge, and a consequent marked degradation of the efficiency of retrieval, notwithstanding a merit of economization of labor.

SUMMARY OF THE INVENTION

A main object of this invention is to provide an image forming apparatus such as a microfilm reader, a microfilm reader/printer, a microfilm printer, or a microfilm scanner, which apparatus is adapted to permit automatic loading and unloading of a cartridge incorporating therein a microfilm containing recorded images.

Another object of this invention is to provide an image forming apparatus which is furnished with a cartridge loader disposed contiguously to a cartridge holder serving the purpose of driving a rewinding reel. This cartridge loader is adapted to allow attachment thereto of a detachable container holding a plurality of cartridges. The container mentioned above is adapted to be disposed freely movably inside the cartridge holder in order that a desired cartridge may be located opposite the cartridge holder.

A further object of this invention is to provide an image forming apparatus which is furnished with a slide box serving the purpose of supporting the aforementioned container and, at the same time, moving the container inside the aforementioned cartridge holder. This apparatus is provided inside the cartridge holder with a cartridge driving member for reciprocating a desired cartridge between the container and the cartridge holder.

Yet another object of this invention is to provide an image forming apparatus which is furnished with a cartridge loader disposed contiguously to a cartridge holder serving to drive a rewinding reel. The cartridge loader allows attachment thereto and detachment therefrom a first container for holding a plurality of cartridges subjected to image retrieval and a second container for holding a plurality of cartridges which have undergone image retrieval and loads the aforementioned cartridge holder with the cartridges delivered in the first container and discharges from the cartridge holder the cartridges which have undergone image retrieval.

Still another object of this invention is to provide an image forming apparatus which is furnished with a memory for recording therein the image frame information introduced therein as an input for permitting search on all of the microfilm frames contained in the plurality of cartridges held in the container and a sensor for detecting the identifying information of a cartridge removed from the container and placed in the cartridge holder and, therefore, is enabled to perform a continuous search on the microfilm frames in all of the cartridges held inside the container.

A further object of this invention is to provide an image forming apparatus which is furnished with a memory for recording therein the image frame information introduced therein as an input for performing search on the microfilm frames in a particular one of a plurality of cartridges held in a container to be selected therefrom and placed in the cartridge holder and, therefore, is enabled to effect injection of the image frame information and search of image on each of the cartridges, load the cartridge holder with all of the cartridges held in the container, and carry out image retrieval.

In accordance with the present invention there is provided a cartridge loading device for attachment to an image projecting apparatus serving to project an image recorded in a microfilm held in a cartridge, which cartridge loading device comprises: a container for accommodating a plurality of cartridges; a container loader for detachably supporting said container; and cartridge moving means for sequentially extracting said cartridges from said container attached to said container loader and setting the extracted cartridges in place in a cartridge holder provided for said image projecting apparatus.

BRIEF DESCRIPTION OF THE DRAWINGS

FIG. 9 is a perspective view illustrating a partition sheet provided in the cartridge loader;

FIG. 10 is a front view illustrating in a magnified scale the essential part of the partition sheet illustrated in FIG. 9;

FIG. 11 is a plan view illustrating the partition sheet illustrated in FIG. 9;

FIG. 12 (B) is a plan view illustrating the partition sheet in the state in which the retainer claw is held in a retracted posture;

FIG. 13 (B) is a plan view illustrating the partition sheet and the cartridge holder in the state assumed after the cartridge holder is loaded with a cartridge;

FIG. 14 is a block diagram illustrating a control circuit for the reader printer;

DESCRIPTION OF THE PREFERRED EMBODIMENTS

Figure 1:
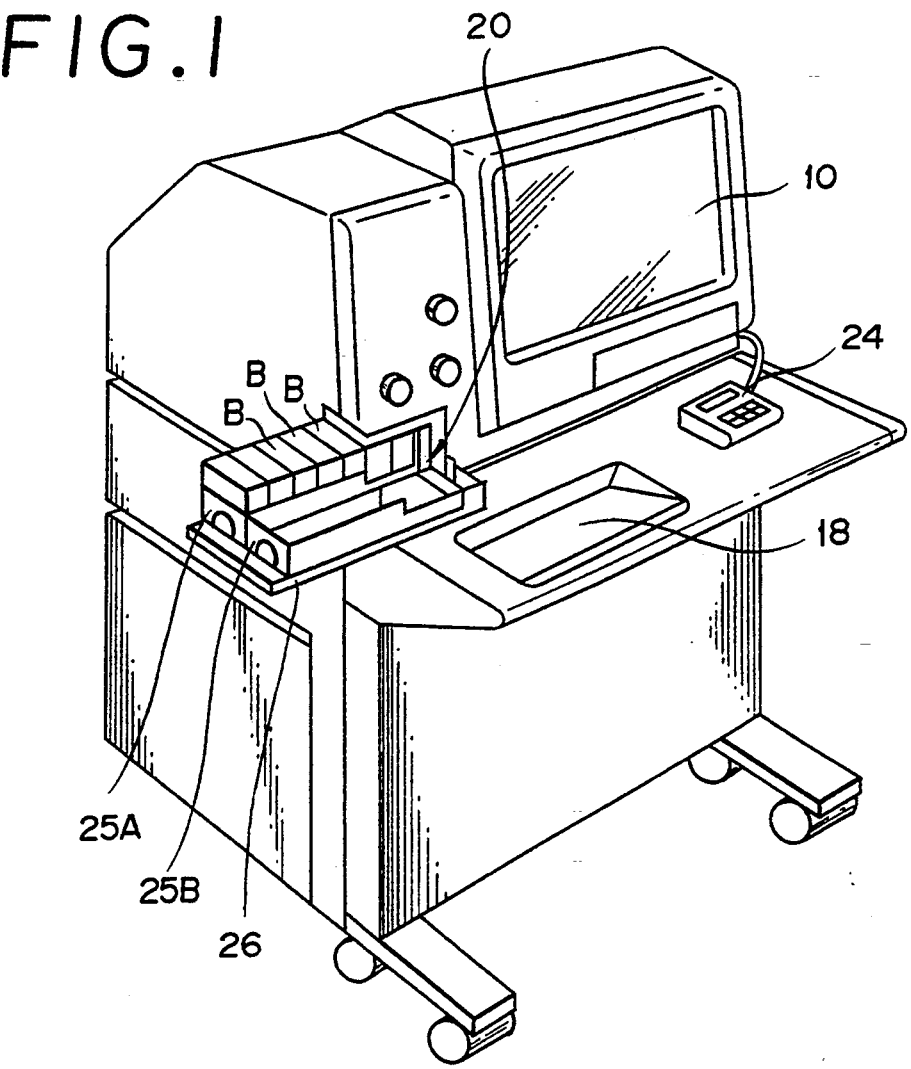
FIG. 1 is a perspective view illustrating a reader/printer provided with a cartridge loader.

As illustrated in FIG. 1, the reader/printer has attached thereto a cartridge loader 26 which is provided with a cartridge holder 20 retaining a cartridge B therein. A rewinding reel having a microfilm wound thereon and incorporated in the cartridge B is rotated in the holder 20 and consequently caused to play out the microfilm. The cartridge loader 26 is adapted to accommodate about 10 to 20 microfilm cartridges B taken out of the aforementioned storage shelf.

To the upper surface of each of the cartridges B, identifying information, specifically a label having a bar code printed thereon (not shown), intended to discriminate the particular cartridge from other cartridges is pasted. The identifying information is read by a code reading sensor provided for the cartridge loader 26 as described specifically hereinafter. The reader/printer is further provided with a retrieving board 24. The retrieving board 24 is intended to effect the input of a cartridge number and a frame number as retrieving information, the input of various commands relating to retrieval, and the input of commands such as for copying the retrieved image. The cartridges B packed in the cartridge holder 20 are searched against a frame number fed in through the retrieving board 24 and the retrieved image is projected on a screen 10 of the reader/printer. When a command to copy the retrieved image is fed in through the retrieving board 24, the reader/printer effects the copying of the image. The papers on which the image is copied are discharged into a discharge paper tray 18.

The retrieving board 24 is provided with an operating key part 24A having various keys arranged thereon and a display part 24B adapted to display the input value produced by the operation of the keys arranged on the operating key part 24A and the condition of retrieval.

Figure 3:
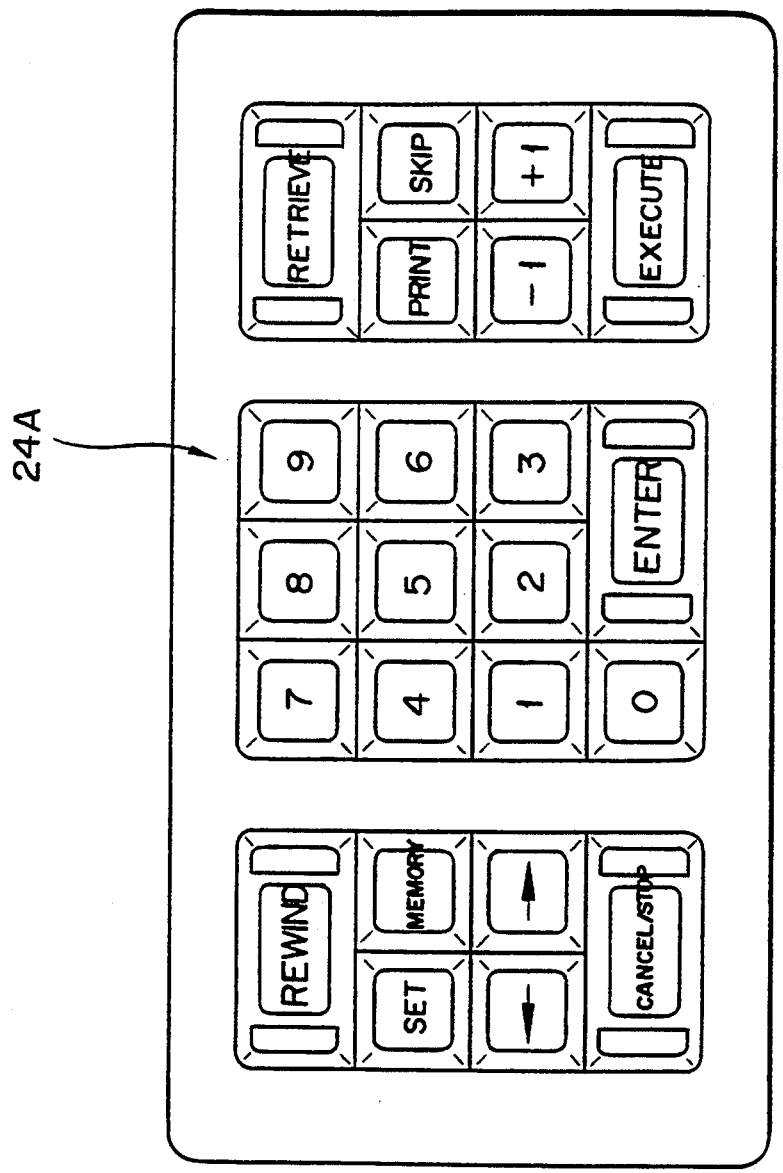
FIG. 3 is a plan view illustrating a key arrangement of the retrieving board illustrated in FIG. 2.

On this operating key part 24A, various keys necessary for retrieval are arranged as illustrated in FIG. 3. The keys bearing the numerals "0" to "9" are number-placing input keys and the "ENTER" key is to be used for punctuating separate pieces of the number input and for shifting from one action of retrieval to another. The "REWIND" key is a key to be used for rewinding the microfilm. The keys bearing the marks "+1" and "−1" are keys for mainly commanding a forward motion of the microfilm by one frame and a rearward motion thereof by one frame respectively. The keys bearing the marks "←" and "→" are keys to be used for forwarding the microfilm at a low speed in the direction of arrow for a period in which the keys are kept depressed. The "EXECUTE" key is a key to be used for executing a command of numeral input and the "CANCEL/-STOP" key is a key to be used for effecting emergency stop of an operation in process or for cancelling a command fed in with keys. The "RETRIEVE" key is a key to be used for retrieving a target frame from the microfilm against the information fed in through the number-placing keys and the "PRINT" key is a key for effecting the copying of the retrieved image. The "SET" key is a key to be used for setting the address of the leading frame of the microfilm and the "SKIP" key is a key to be used for effecting skipping retrieval. Finally, the "MEMORY" key is a key to be used for carrying out an operation of memory. The retrieving board 24 issues as an output the command fed in by the manipulation of the various keys described above.

Figure 4:
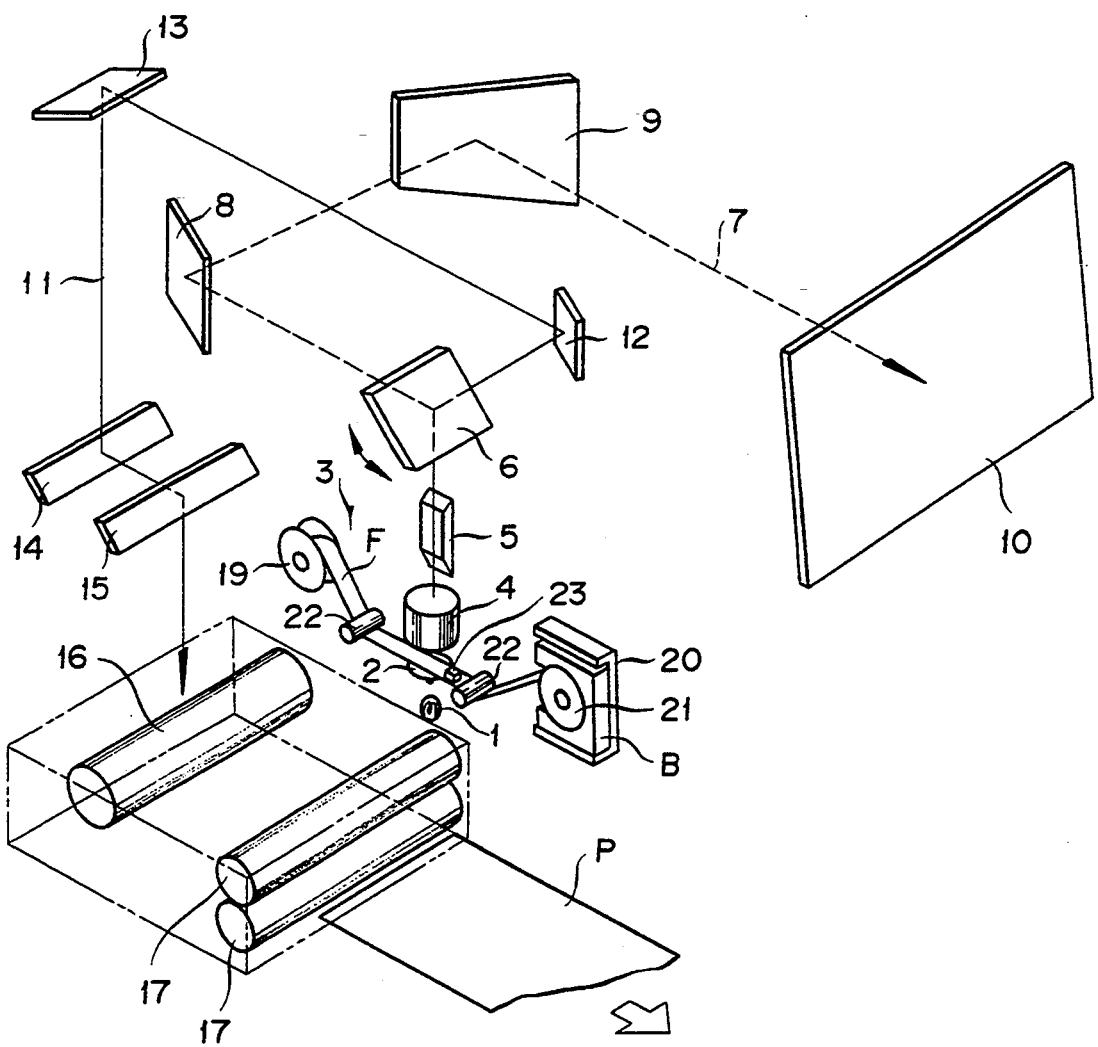
FIG. 4 is a schematic perspective view illustrating an optical system disposed inside the reader/printer illustrated in FIG. 1.

The optical system in this reader/printer is constructed as illustrated in FIG. 4. Specifically, the light from a light source i is condensed by a condenser lens 2 and projected to illuminate upwardly the image in the microfilm F positioned between retainer glass sheets (not shown) of a film carrier 3. The image in the microfilm F through which the light has passed is projected in a magnified scale by a projecting lens 4 and advanced to a mirror 6 optionally through the medium of a prism 5 adapted to adjust the direction of the path of this light.

A reader light path 7 is formed as indicated by a broken line in FIG. 4 when the reader/printer is in the reader mode. During the operation in this mode, the light is reflected on the mirror 6 in an immobilized state and further reflected on mirrors 8 and 9 and advanced to the screen 10. As a result, the image in the microfilm F is projected in a magnified scale for easy inspection on the screen 10 disposed in the upper part of the front surface of the reader/printer.

In place of the reader light path 7, a printer light path 11 is formed as indicated by a solid line in the same diagram when the reader/printer is in the printer mode. During the operation in this mode, the light is advanced in the direction of a photosensitive body 16 by being reflected on mirrors 12, 13, 14, and 15 which have been switched and set fast for the purpose of screening by rotating the mirror 6 with an angle of 90 around the axis of incident light. As a result, the image in the microfilm F is slit projected in a magnified scale on a rotating drum-shaped photosensitive body 16, as synchronized with the swing scanning motion of the mirror 6 produced about the axis perpendicular to the optical axis. The image on the photosensitive body is copied through the known process. The copied image formed on a recording paper P is fixed by a treatment given between fixing rollers 17. The recording paper P which has undergone the copying process is discharged into a discharge paper tray 18 disposed in the lower part of the front side of the reader/printer.

The cartridge B retained in the cartridge holder 20 has a rewinding reel 21 incorporated therein. The microfilm F played out this reel 21 is forwarded by the film carrier 3 to a winding reel 19 and wound up on this reel 19. The winding reel 19 and the rewinding reel 21 are rotationally driven by their respective driving sources (not shown) in both the forward and rearward directions. The microfilm F is conveyed in the feeding direction and the rewinding direction between the two reels as guided by guides roll 22 and passed through the gap between the retaining glass sheets. The conveying path of the microfilm F is provided with a sensor 23 serving the purpose of detecting blip marks inscribed on the microfilm. This sensor 23 is used for the purpose of retrieving a desired image frame and reading the identifying information on the microfilm described specifically hereinbelow.

Figure 5:
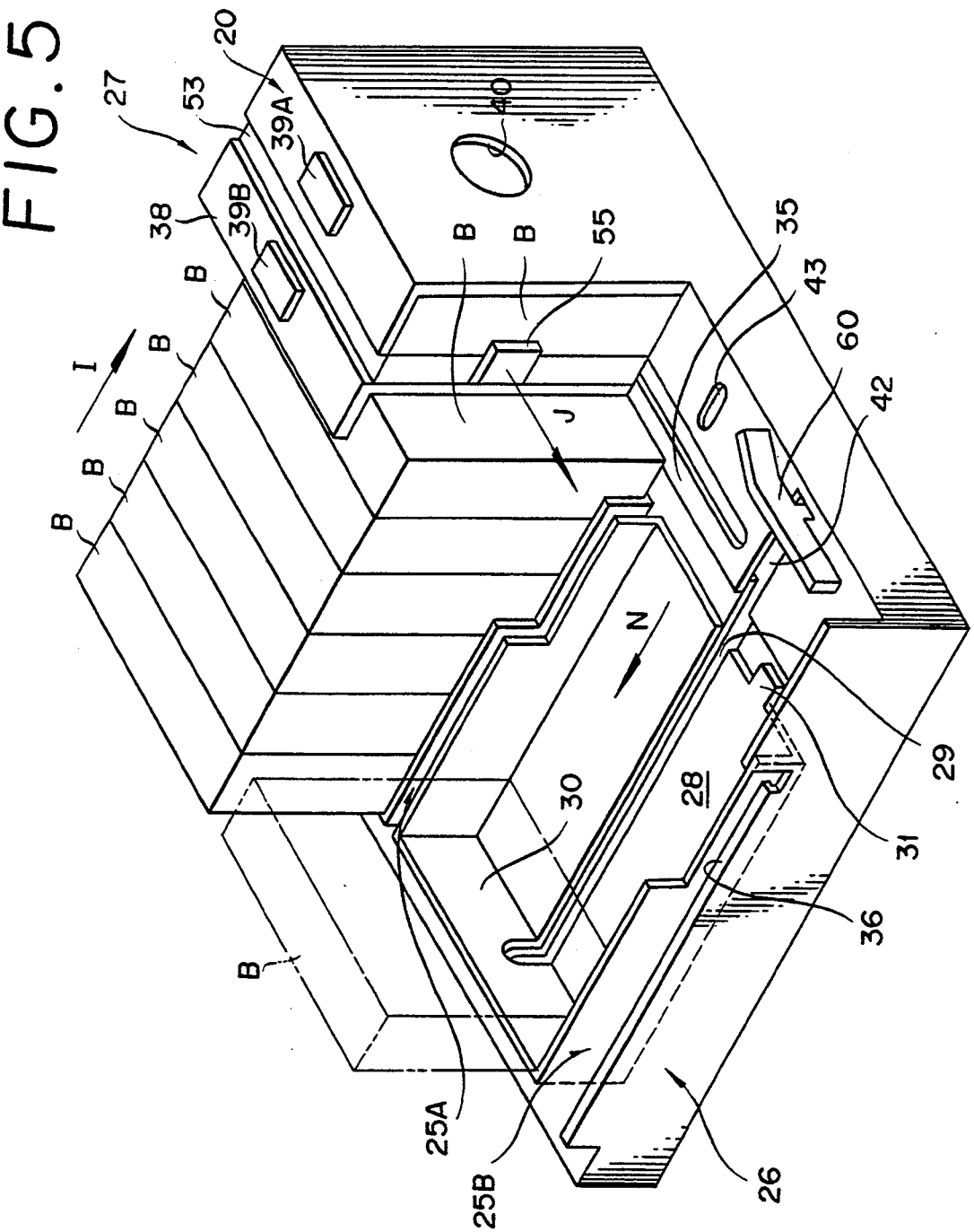
FIG. 5 is a perspective view illustrating the details of the cartridge loader illustrated in FIG. 1.

The cartridge loader 26 allows attachment thereto of two containers 25A and 25B as illustrated in FIG. 1. These two containers are each adapted to accommodate a prescribed number of cartridges B. Further, the containers are portable independently of each other. The containers 25A and 25B are called otherwise as "carrier boxes" and each shaped like a shallow tray open in the upper and front sides as illustrated in FIG 5.

In the central part of a floor surface 28 of each of the containers 25A and 25B, one long groove 29 is longitudinally formed. This long groove 29 reaches a rear wall 30 of the container. A detecting projection 31 is formed on the leading edge of the container and projections 32 are formed on each of the outer surfaces of the opposite lateral walls of the container. These projections 32 are formed two each on one lateral wall as illustrated. Open holes 34 are formed in only one lateral wall 33 of each of the containers 25A and 25B. These open holes 34 are formed two arranged side by side above the projections 32 closer to the rear wall 30 of the container than the projections 32.

About ten to twenty cartridges B are set in place in the container so as to be carried together with the container. The group of cartridges is retained by the lower part thereof on the space of the floor surface 28 of the container surrounded with the opposite lateral walls 33 and the rear wall 30. The individual cartridges B in the group are set upright on their sides as superposed longitudinally along the long groove 29. On the rewinding reel 21 (shown in FIG. 4) inside the cartridge B, the microfilm F produced in the form of a strip containing images one each in the series of frames is wound up.

Generally, the cartridges B for the microfilm F of this kind are broadly divided into those of the ANSI specification type and those of the 3M.M type. These two types are different from each other in structure of the union of the cartridge to the driving shaft of the rewinding reel 21, presence or absence of the necessity for a reel retainer, presence or absence of the reader at the leading end of the microfilm F, and manner of the feeding of the microfilm F. Structurally, the cartridge loader 26 and a cartridge moving mechanism 27 as well as the containers 25A and 25B are adaptable safely for the cartridges B of either of the types mentioned above. In other words, this apparatus is usable equally effectively with the cartridges B of the ANSI specification type and with those of the 3M.M type. It also permits combined use of the cartridges B of both these two types. Further, the aforementioned film carrier 3 and the cartridge holder 20 therefor are adaptable for the cartridges B of both of the types. To the mechanisms which render the holder 20 and other parts adaptable for both these types of cartridges B, the known technique can be applied.

Figure 7:
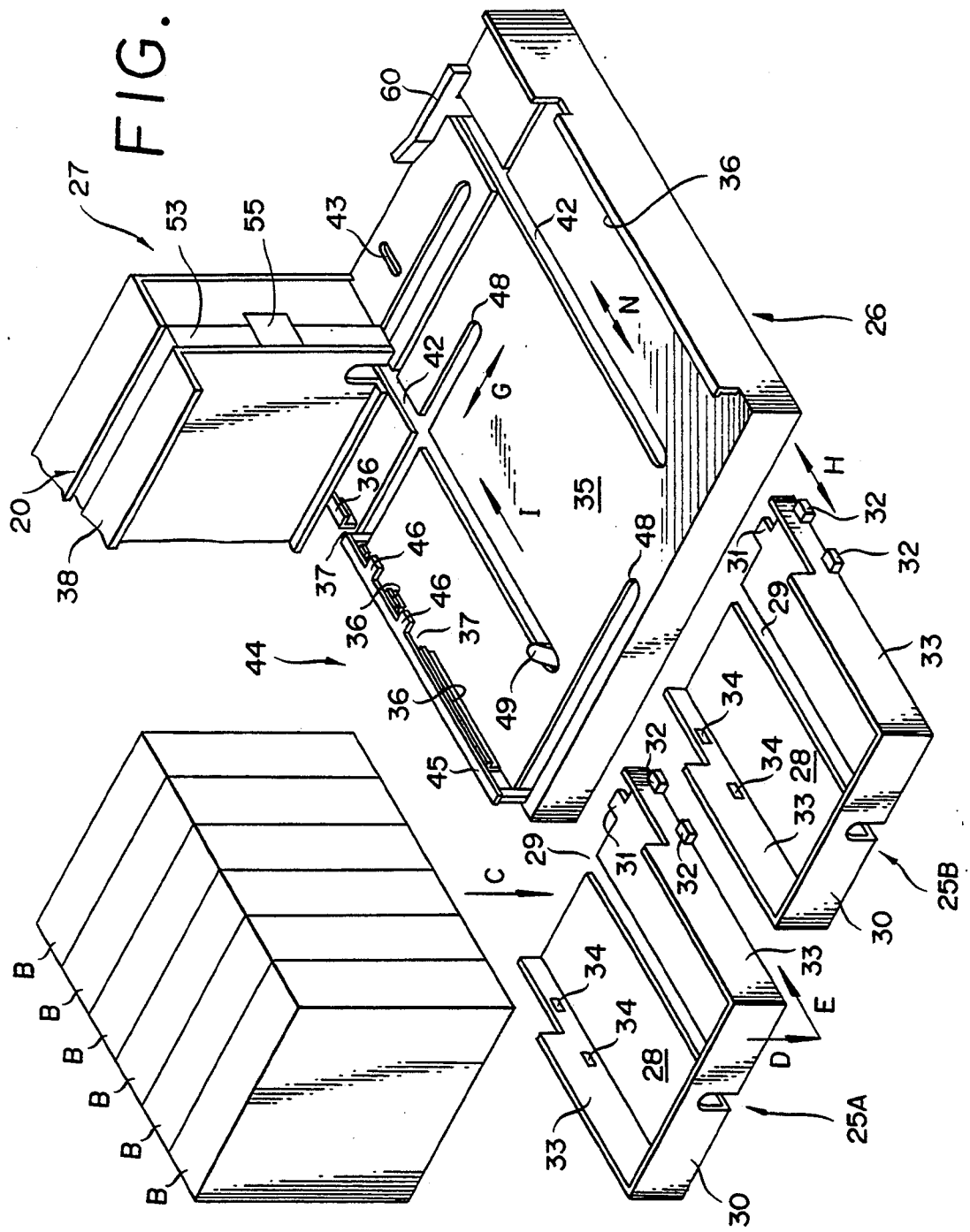
FIG. 7 is an exploded perspective view illustrating a cartridge, a container, and the cartridge loader.

The cartridge loader 26 is adapted, as illustrated in FIG. 7, to allow attachment thereto of the two containers 25A and 25B of an identical shape. This loader 26 is attached to and fixed on the front lateral part of the reader/printer and furnished with an upper surface 35 forming a flat base. In the illustrated embodiment, the two containers 25A and 25B are attached to the upper surface 35 as arranged side by side with their open front sides falling flush with each other. Initially at the time of attachment, the one container 25A admits about ten to twenty cartridges B in the vertical direction indicated by the arrow mark C shown in FIG. 7 and the other container 25B remains in an empty state. The loader 26 is provided on each of the opposite lateral sides thereof with a rail 36 having an L-shaped cross section. The rails 36 are so adapted that the projections 32 formed on the lefthand lateral wall 33 in the bearings of FIG. 7 of the one container 25A and the projections 32 formed on the righthand lateral wall 33 of the other container 25B will come into working contact with the rails 36. By the fact that the upper parts of the two bent rails 36 are located above the corresponding projections 32, the two containers 25A and 25B are locked and retained irremovably. Incidentally, these two containers 25A and 25B assume a state in which the projections 32 formed on the righthand lateral wall of the container 25A and the projections 32 formed on the lefthand lateral wall of the container 25B will come into mutual contact.

Figure 8:
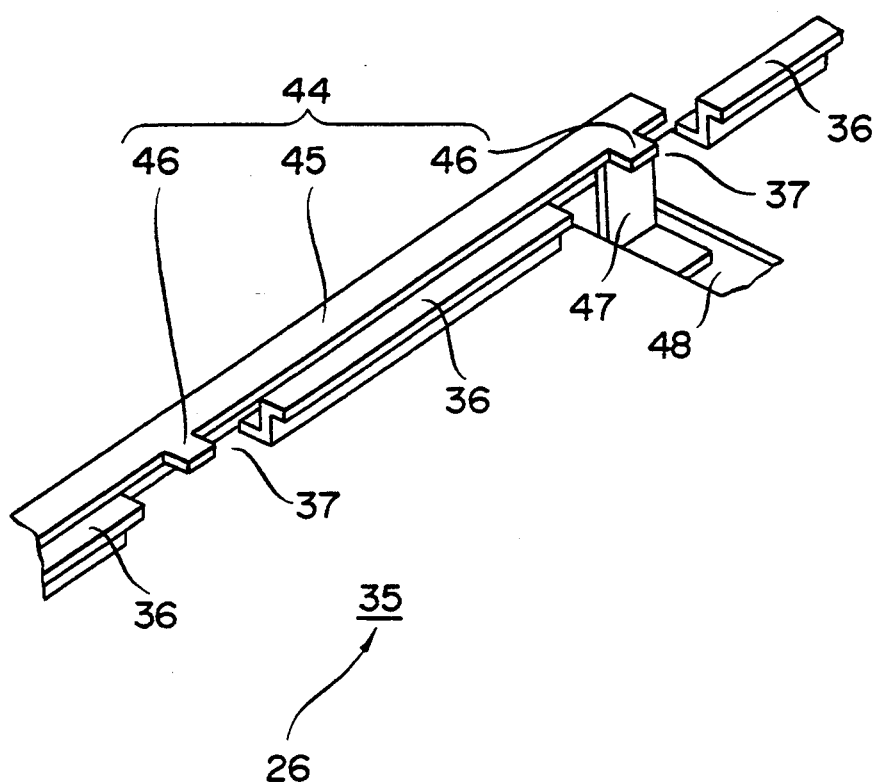
FIG. 8 is a perspective view illustrating a container moving mechanism provided in the cartridge loader.

In only one of the rails, specifically the rail 36 on the lefthand side in the bearings illustrated, notches 37 are formed as illustrated in FIG. 7 and FIG. 8. During the attachment of the container 25A to the aforementioned loader 26, by inserting the two projections 32 of the container 25A in the vertical direction indicated by the arrow mark D in the bearings of FIG. 7 until these projections are located in the notches 37 and thereafter moving the container 25A forward in the direction of the arrow mark E in the bearings of FIG. 7, the projections 32 on the lefthand lateral wall 33 are locked in the rail 36 and the container 25A is set in position and retained there.

Incidentally, in the corner part of the upper surface 35 of the aforementioned loader 26, the cartridge holder 20 forming part of the aforementioned film carrier 3 is positioned substantially opposite the open front side of the one container 25A, namely the group of cartridges B accommodated therein. A cartridge waiting part 38 appearing in FIG. 5 and FIG. 7 is disposed immediately before the cartridge holder 20 as separated by an intervening space equaling the thickness of a partition sheet 53 which will be specifically described hereinbelow. A code reading sensor 39A for reading the identifying information placed on each of the cartridges B is provided on the cartridge holder 20 and a cartridge detecting sensor 39B for discriminating between the presence and absence of a cartridge to be searched is provided on the cartridge waiting part 38 as illustrated in FIG. 5. In the lateral surface of the cartridge holder 20, an opening 40 for insertion of a driving shaft is formed as illustrated in FIG. 5.

Figure 6:
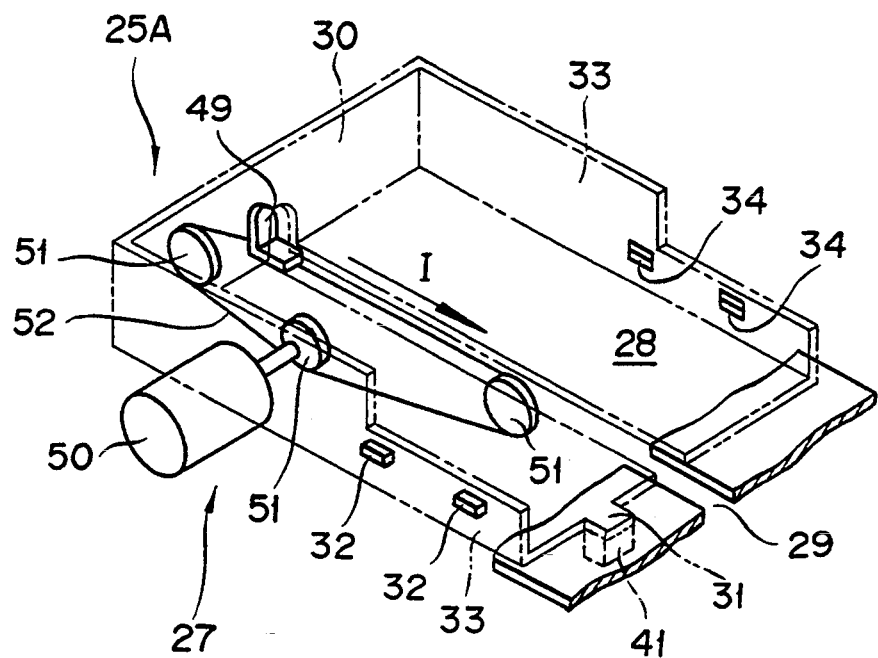
FIG. 6 is a perspective view illustrating a container moving mechanism provided in the cartridge loader illustrated in FIG. 1.

The loader 26 incorporates container detecting sensors 41 therein at the positions corresponding to those occupied by the detecting projections 31 of the containers 25A and 25B when the containers are in an attached state (shown in FIG. 6). These detecting sensors 41 are those of the reflection type, for example, and are adapted to detect the motions of attachment and detachment of the containers 25A and 25B. On the upper surface 35 of the aforementioned loader 26, longitudinal grooves 42 are parallelly formed at the positions corresponding to those occupied by the long grooves 29 of the containers 25A and 25B when the containers are in an attached state as illustrated in FIG. 7. The longitudinal grooves 42 lie parallelly to the rails 36 and the longitudinal groove 42 corresponding to the one container 25A extend through the cartridge waiting part 38 to the cartridge holder 20. An opening 43 formed in the upper surface 35 of the aforementioned loader 26 contiguously to the cartridge holder 20 illustrated in FIG. 5 and FIG. 7 is intended to allow protrusion therethrough of a stopper which will be described specifically hereinbelow.

A container moving mechanism 44, as illustrated in FIG. 8, is actuated after all of the cartridges B held in the one container 25A have undergone the steps of searching and copying, the group of the cartridges B has been transferred as a used set to the other container 25B, and this container 25B has been removed from the aforementioned loader 26. When the container moving mechanism 44 is actuated, the one container 25A which has been emptied is moved on the upper surface 35 of the aforementioned loader 26 to the position at which the other container 25B was formerly placed.

Now, the moving mechanism 44 will be described in detail below. On the lefthand side of the loader 26, a long platelike moving member 45 is disposed above the aforementioned rail 36 parallelly thereto and projections 46 are formed in the moving member 45 at positions corresponding to those occupied by the openings 34 of the container 25A when this container is in an attached state as illustrated in FIG. 7 and FIG. 8. The moving member 45 is connected through the medium of a retaining member 47 to the driving device (not shown) and is adapted to reciprocate in the lateral direction indicated by the arrow mark G shown in FIG. 7 along a lateral groove 48 formed in the upper surface 35 of the loader 26 in the direction perpendicular to the lateral groove 42. The reciprocation of the retaining member 47 inside the lateral groove 48 enables the moving member 45 to reciprocate in the direction of the arrow mark G.

When the sensor 41 detects the fact that the one container 25A is emptied and the other container 25B is drawn and removed in the longitudinal direction indicated by the arrow mark H shown in FIG. 7, the driving device is turned on and the moving member 45 is moved in the direction of the arrow mark G from the waiting position as illustrated in FIG. 7. As a result, projections 46 of the moving member 45 are brought into engagement with the openings 34 of the container 25A, moved in the direction of the arrow mark G on the upper surface 35 of the loader 26 while retaining the container 25A therewith, and allowed to move the container 25A to the position formerly used for attachment of the other container 25B. Thereafter, the moving member 45 alone returns to the waiting position. While the moving member 45 remains in the waiting position, the projections 46 assume such positions as to offer no hindrance to the insertion of the projections 32 into the notches 37 of the rail 36. During the attachment of the container 25A to the aforementioned loader 26, therefore, the moving member 45 refrains from interfering with the work of attachment of the container 25A.

The cartridge moving mechanism 27 is intended to extract necessary cartridge B sequentially from the container 25A on the loader 26, lead them to the cartridge holder 20 provided for the film carrier 3 of the reader/printer, and place them therein. The cartridge moving mechanism 27 is further adapted to discharge the used cartridges B and place these cartridges B in the other container 25B different from the one container 25A mentioned above. To be more specific, the cartridge moving mechanism 27 is provided with a depressing plate 49 as illustrated in FIG. 6. The depressing plate 49 is connected to a motor 50 as a drive source through the medium of pulleyes 51 and a belt 52 as illustrated in FIG. 6. This depressing plate 49 is allowed to protrude upwardly from the long groove 29 of the one container 25A in an attached state through the one longitudinal groove 42 of the loader 26. When the motor 50 is set into motion, the depressing plate 30 is moved from the home position behind the rear wall 30, brought into and guided along the long groove 29, and reciprocated in the longitudinal direction indicated by the arrow mark I in the diagram.

When the detecting sensor 41 detects the detecting projection 31 of the container 25A and senses the motion of the attachment of the container 25A to the cartridge loader 26, the motor 50 is actuated to move the depressing plate 49 from its home position until it collides into the rear end side of the group of cartridges held in the container 25A, push it in the direction of the arrow mark I namely toward the cartridge holder 20, and come to a stop when the leading end side of the group of cartridges collides into the partition sheet 53 which will be described specifically hereinbelow. Thereafter, the depressing plate 49 intermittently repeats a cycle consisting of a forward motion in the direction of the arrow mark I and a slight rearward motion after use of each of the cartridges B so as to guide the cartridges B sequentially to the cartridge holder 20. After all of the cartridges B in the container 25A have been used or after they have been wholly removed from the container 25A for some reason or other, the depressing plate 49 returns to the home position. Specifically, it returns to the home position slightly behind the rear wall 30 of the container 25A so as to avoid obstructing the movement of the container by the container moving mechanism 44 and the attachment of the other container holding the other cartridges B to the loader 26.

The cartridge moving mechanism 27 is provided with the partition plate 53. FIG. 9 is a perspective view illustrating the partition plate 53 and FIG. 10 is a front view illustrating the essential part of the partition plate 53 in a magnified scale.

The partition plate 53 extracts the cartridges B sequentially from the container 25A, leads them to an place in the cartridge holder 20, and thereafter discharges the used cartridges B. In other words, the partition plate 53 is disposed along the cartridge holder 20 and is adapted to be reciprocated by the driving mechanism (not shown) between the home position opposite the cartridge holder 20 and the discharge position separated in the lateral direction indicated by an arrow mark J shown in FIG. 5 and FIG. 9 from the home position by a distance substantially equal to the width of the cartridge B. The partition plate 53 has a length slightly larger than the width of the cartridge B and is provided on one side thereof with a drawing claw 54 and on the other side thereof with a retaining claw 55. The drawing claw 54 is joined with a pin to one side of the partition plate 53 in such a manner as to be rotated with a vertical rotary shaft. This drawing claw 54 is urged with a spring (not shown) in the counterclockwise direction indicated by an arrow mark K shown in FIG. 11. Normally, it remains in contact with a stopper 56 formed on one end side of the partition plate 53 and consequently retains an operating posture forming a right angle with the partition plate 53 and protruding in the direction of the cartridge holder 20 as illustrated by virtue of its contact.

The drawing claw 54, in the operating posture, functions to catch hold of one side of a used cartridge B and move this cartridge B and remove it from the cartridge holder 20. Though the drawing claw 54 normally retains the operating posture, it is allowed during the loading of each of the cartridges B to collide into the cartridge B being loaded and consequently rotate itself in the clockwise direction opposite to the direction indicated by the arrow mark K in spite of the urging force of the spring and temporarily assume a retracting posture inclining instead of protruding from the partition plate 53.

The retaining claw 55 is joined with a pin to the other side of the partition plate 53 in such a manner as to be rotated by a vertical rotary shaft. The retaining claw 55 is urged by a spring (not shown) in the counterclockwise direction indicated by the arrow mark K shown in FIG. 11. Normally, it remains in contact with a locking member 57 attached to the other end side of the partition plate 53 and consequently retains an operating posture forming a right angle with the partition plate 53 and protruding in the direction of the cartridge holder 20 as illustrated. This retaining claw 55 in the operating posture catches hold of the other end of an unused cartridge B, introduces it into the cartridge holder 20 in consequence of the movement of the partition plate 53, and places it in the cartridge holder 20 to be retained therein. The spring mentioned above, therefore, is endowed with an urging force enough for the retaining claw 55 to catch hold of one cartridge B and move it to the stated position in the cartridge holder 20. Though the retaining claw 55 normally golds the operating posture, it is allowed after the discharge of one cartridge B and during the loading of the next cartridge B to collide into the discharged cartridge B and, owing to the fact that the discharged cartridge B has been already stopped by a stopper 62 (see FIG. 15 (F)), rotate itself in the clockwise direction opposite to the direction indicated by the arrow mark K by overcoming the urging force of the spring and, consequently, hold temporarily a retracted posture inclining instead of protruding from the partition plate 53.

The locking member 57 is enabled to assume an unlocking position in addition to the aforementioned locking position. To be specific, the locking member 57 is attached to the other side of the partition plate 53 in such a manner as to be moved in the vertical direction indicated by an arrow mark L shown in FIG. 9 as guided inside a guiding groove 61 formed by incision. When the locking member 57 is moved upwardly and brought into the locking position, it collides into the retainer claw and begins to function as a stopper and causes the retainer claw 55 to retain its operating posture. When the locking member 57 is moved downwardly and brought into the unlocking position, the retaining claw 55 which is no longer collided into by the locking member 57 functioning so far as a stopper is rotated in the direction indicated by the arrow mark K shown in FIG. 11 by the urging force of the spring and consequently made to assume a retracting posture inclining toward the partition plate 53. Thus, the retaining claw 55 is capable of shifting from the operating posture to the one retracting posture inclining in the clockwise direction as described above and to the other retracting posture inclining in the counterclockwise direction indicated by the arrow mark K.

Figure 12A:
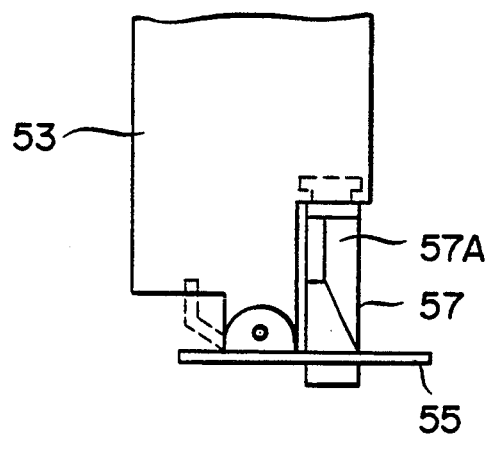
FIG. 12 (A) is a plan view illustrating the state in which a retainer claw provided in the partition sheet is held in an operating posture.
Figure 12B:
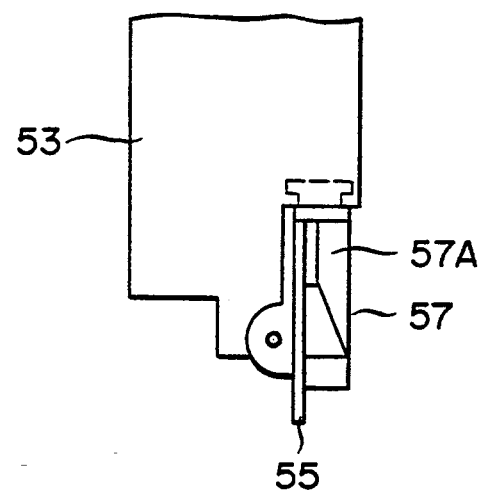
Figure 13A:
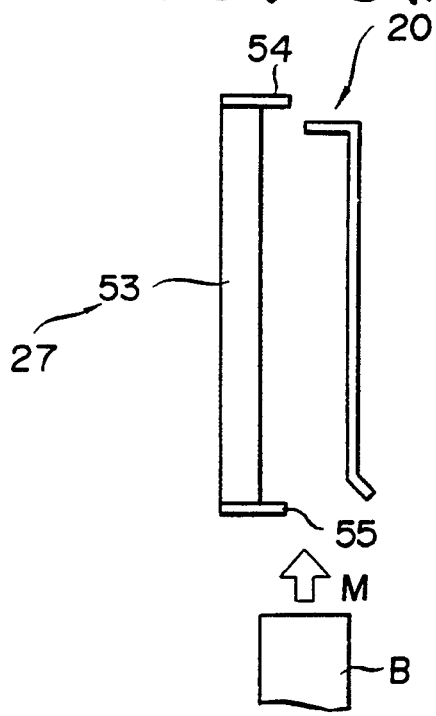
FIG. 13 (A) is a plan view illustrating the partition sheet and the cartridge holder in the state assumed before the cartridge holder is loaded with a cartridge.
Figure 13B:
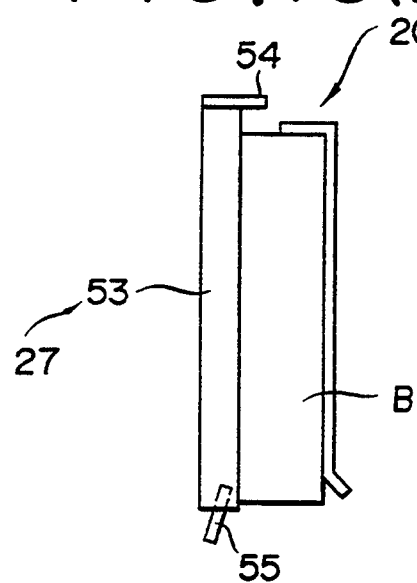
Figure 15A:
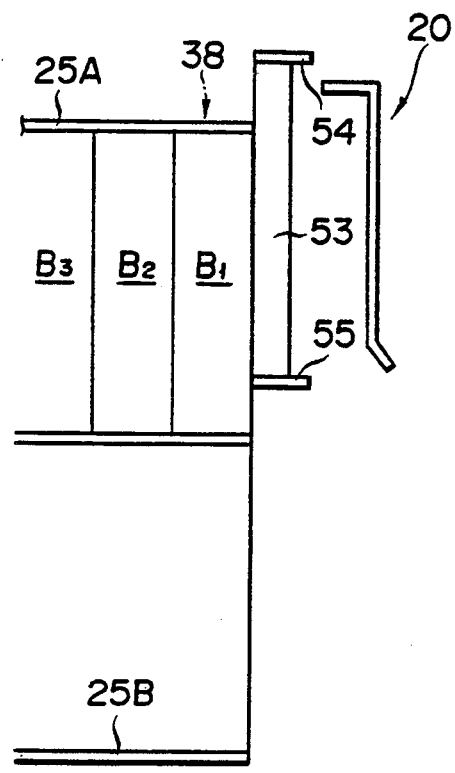
FIGS. 15 (A) to 15 (H) are process diagrams serially illustrating an operation of loading the cartridge holder with cartridges and an operation of unloading the cartridges from the cartridge holder.
Figure 15B:
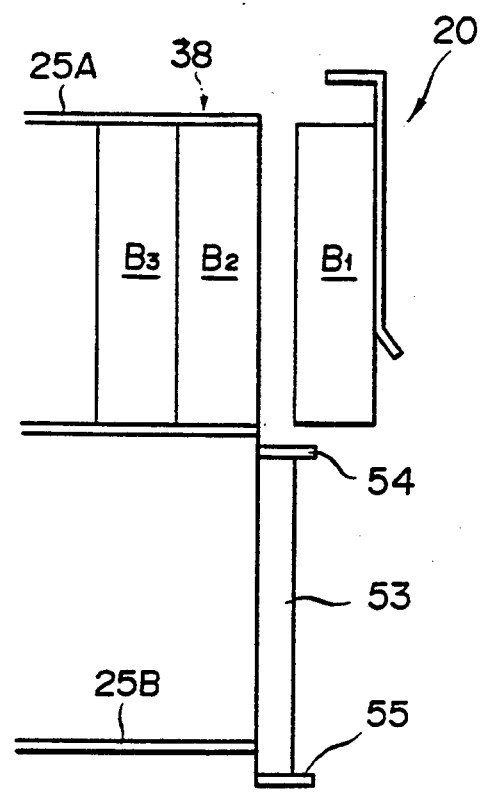
Figure 15C:
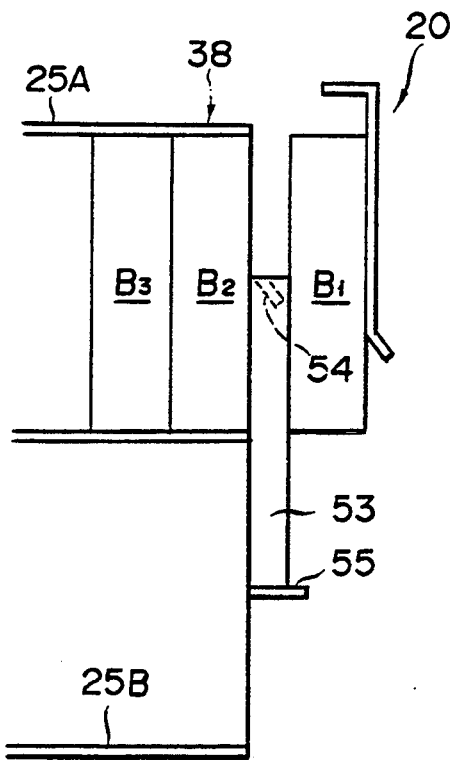
Figure 15D:
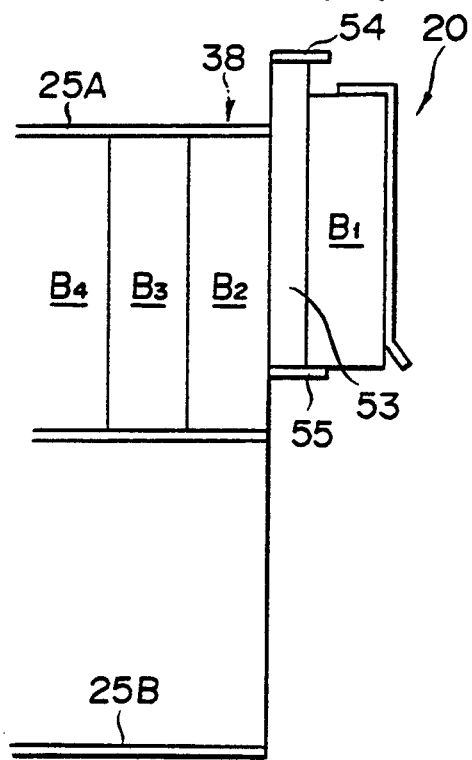
Figure 15E:
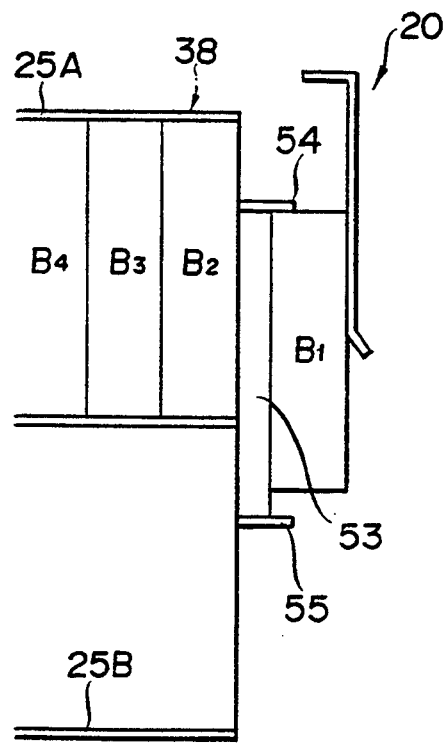
Figure 15F:
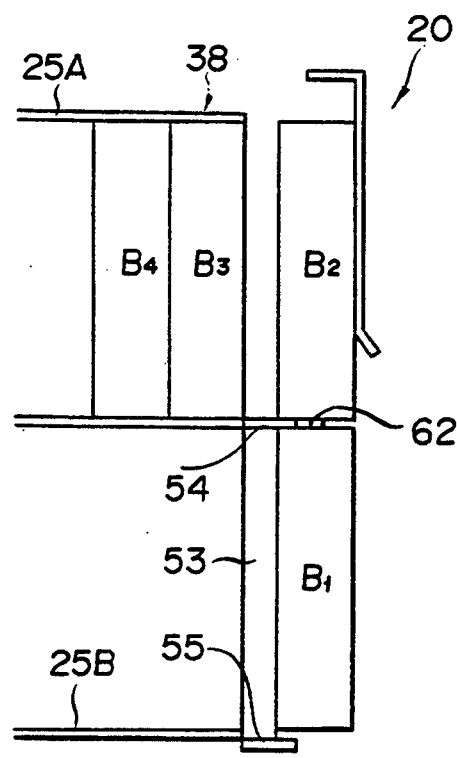
Figure 15G:
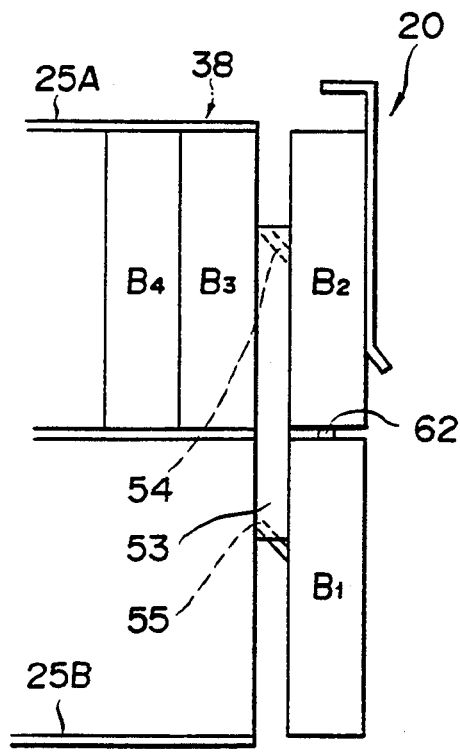
Figure 15H:
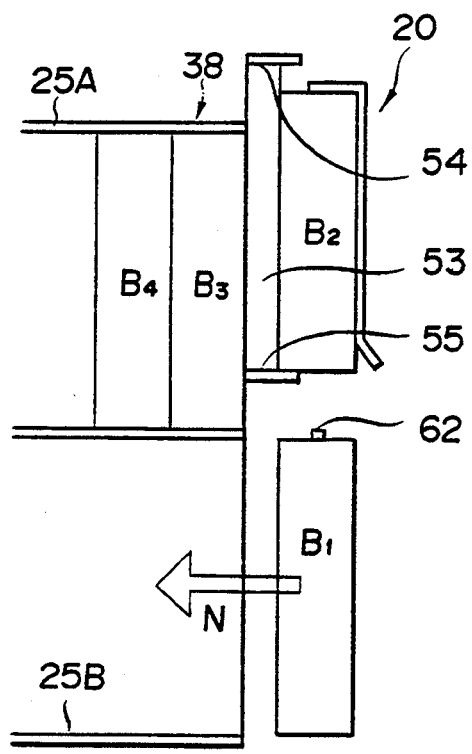

When the locking member 57 assumes the unlocking position and the retaining claw 55 assumes the retracting posture illustrated in FIG. 12 (B), the cartridge holder 20 is caused to allow manual insertion therein of a cartridge other than the cartridges held in the container 25. In other words, the assumption of the specific states mentioned above allows a temporary stop of the automatic loading of the cartridge holder 20 with cartridges B from the container 25A held in the state illustrated in FIG. 5 and consequently enables the cartridge holder 20 to be manually loaded instead with other cartridges B from the other side of the partition plate 53. FIG. 13 is a plan view illustrating the partition plate in the state allowing the manual insertion of the cartridges B described above; FIG. 13 (A) depicting the state assumed prior to the unlocking and FIG. 13 (B) the state assumed during the manual insertion following the unlocking. In short, the insertion of the other cartridges B in the lateral direction indicated by an arrow mark M shown in the diagram is accomplished by the retainer claw 55 shifting from the operating posture shown in FIG. 13 (A) to the retracting posture shown in FIG. 13 (B).

An inclined surface 57A illustrated in FIG. 9 and FIG. 10 is formed on the upper surface of the locking member 57 as inclined relative to the horizontal plane and adapted to guide the retaining claw 55 and rotate it smoothly in the clockwise direction shown in FIG. 11 during the return of the locking member 57 from the unlocking position to the locking position in the upper level. A reel retainer 58 illustrated in FIG. 9 and FIG. 11 is disposed at the center of the partition plate 53 and is so adapted that, in case where the cartridges B of the 3 M.M type are selected for use in the apparatus, it will function to establish coincidence of the rewinding reel 21 (shown in FIG. 4) with the center of a driving shaft 59.

A returning plate 60, as illustrated in FIG. 5 and FIG. 7, protrudes from the longitudinal groove 42 on the righthand side of the loader 26. The position of this longitudinal groove 42 coincides with the position of the long groove 29 formed in the container 25B. The returning plate 60 is guided by a driving device (not shown) from the retracting position shown in FIG. 7 to the long groove 29 of the other container 25B and is adapted to be reciprocated in the longitudinal direction indicated by an arrow mark N shown in FIG. 5 and FIG. 7. This returning plate 60 begins to move in the direction of the arrow marks N when the used cartridge B is discharged by the partition plate 53 from the cartridge holder 20 in the direction indicated by an arrow mark J shown in FIG. 5 and moved to the position opposite that of the returning plate 60 kept at the waiting position. It then pushes the discharged cartridge B, transfers it to the container 25B, and returns to the waiting position. The returning plate 60 operates to stow the used cartridges B sequentially in the container 25B by effecting the reciprocation described above each time one cartridge B is used and discharged.

FIG. 14 is a block diagram illustrating a control circuit for the image forming apparatus.

This control circuit can be roughly divided, as enclosed with a dotted line in the diagram, into a retrieving board controlling part 70 which mainly discharges the burden of a retrieving work and a film loader controlling part 75 which discharges the burden of a work of conveying a microfilm. The retrieving board controlling part 70 is composed of an operating key part 24A, a display part 24B, a memory part 72, and a CPU 71. The operating key part 24A is used to issue various commands regarding image retrieval. The commands are stored by the CPU 71 in the memory part 72. In the display part 24B, the various pieces of information fed in through the operating key part 24A, for example, are displayed. The film loader controlling part 75 is composed of a code detecting sensor 39A for reading the information for identifying cartridges, a cartridge detecting sensor 39B for determining the question as to whether or not cartridges yet to be searched are present, a cartridge loading mechanism 76 for loading the cartridge holder 20 with cartridges B or unloading the cartridges B therefrom, the film conveying mechanism 3 for conveying a desired frame of a microfilm F to the position for projection, a driving circuit 73 for effecting the driving of the cartridge loading mechanism 76 and the film conveying mechanism 3, and a CPU 74 for governing the controls which pertain to the film loading system. The CPU 71 and the CPU 74 interchange signals and these two CPU's fulfil the whole series of controls concerning image retrieval.

The present image projecting apparatus is adapted to effect automatic loading and unloading of cartridges B in compliance with the commands from the retrieving board 24. Here, the operations as of loading of cartridges B by the use of the cartridge moving mechanism 27 of the foregoing description will be described below with reference to FIG. 15.

FIG. 15 (A) illustrates the waiting step of the partition plate 53. The first cartridge B1 forming the leading one of the group of cartridges accommodated in the one container 25A is passed through the opening of the container 25A and placed in the cartridge waiting part 38 and retained in contact with the partition plate 53 of the cartridge moving mechanism 27. The partition plate 53 has the opposite surface thereof at the home position opposite the cartridge holder 20 of the film carrier 3 of the reader/printer. At this time, the drawing claw 54 and the retaining claw 55 of the partition plate 53 are urged by their own springs and caused to assume an operating posture protruding perpendicularly from the partition plate 53. When a signal to start search for retrieval is fed in to the reader/printer in the ensuant state, the partition plate 53 is retracted from the position at the leading end of the one container 25A to the returning position substantially opposite the front open side of the other container 25B as illustrated in FIG. 15 (B). At the same time, the depressing plate 49 is actuated to move the group of cartridges toward the cartridge holder and consequently make the first cartridge B1 depart from the cartridge waiting part 38 and collide into the cartridge holder 20. At the next step, the partition plate 53 begins to return from the returning position to the home position as illustrated in FIG. 15 (C). As a result, it slides in between the first cartridge B1 and the second cartridge B2 and then intervenes therebetween. In this while, the depressing plate 49 is forced back toward the home position for retraction by a distance equal to the thickness of the partition plate 53 and the second cartridge B2 is placed in the cartridge waiting part 38. In the meantime, the drawing claw 54 of the partition plate 53 comes into contact with the first cartridge B1 and consequently shifts from the operating posture to the retracting posture in spite of the urging force of the spring. Thus, it is prevented from interfering with the sliding entry of the partition plate 53.

Thereafter, when the partition plate 53 further continues its return motion toward the home position and eventually assumes the operating posture, the retaining claw 55 catches hold of the other side of the first cartridge B1 and guides the first cartridge B1 already held in contact with the cartridge holder 20 further toward the cartridge holder 20 as illustrated in FIG. 15 (D). As a result, the drawing claw 54 is released from one side of the first cartridge B1 and returned to the operating posture as illustrated. In consequence of the return of the partition plate 53 to its home position, the first cartridge B1 is positioned for retention in the cartridge holder 20.

When the return of the partition plate 53 to its home position is detected by some detecting means (not shown), the reader/printer is readied for image retrieval. This image retrieval is carried out by loading the film carrier 3 with the microfilm F from the rewinding reel 21 of the cartridge B1, reciprocating the microfilm F between the rewinding reel 21 and the winding reel 19, and causing the sensor 23 to check the blip marks placed in the frames of the microfilm F against the identifying information. The partition plate 53 is set at the state of discharge motion illustrated in FIG. 15 (E) after the search for retrieval is completed and the microfilm F is rewound on the same rewinding reel 21 as mentioned above. In other words, the partition plate 53 begins to move from the home position to the position as a destination. Thereafter, the drawing claw 53 which has assumed the operating posture catches hold of one side of the first cartridge B1 and begins to move in company therewith.

Then, the partition plate 53 is transferred from the leading end part of the one container 25A to the forward part of the other empty container 25B and, at the same time, the first cartridge B1 is discharged by the partition plate 53 to the position opposite that of the other container 25B as illustrated in FIG. 15 (F). Now, the depressing plate 49 is again actuated to move the group of cartridges B toward the cartridge holder 20 and make the second cartridge B2 depart from the cartridge waiting part 38 and come into pressed contact with the cartridge holder 20. Further, the stopper 62 protrudes from the opening 43 of the aforementioned loader 26 and continues to move and slides in between the first cartridge B1 and the second cartridge B2. Then, the partition plate 53 begins a return motion in the direction of the home position as illustrated in FIG. 15 (G). The partition plate 53 consequently slides in between the second cartridge B2 and the third cartridge B3 and eventually intervenes therebetween. In this case, the depressing plate 49 is moved back slightly in the same manner as described above. Thus, during the course of return of the partition plate 53, the drawing claw 54 collides into the second cartridge B2 as described above and shifts from the operating posture to the retracting posture in spite of the urging force of the spring and consequently refrains from obstructing the sliding insertion of the partition plate 53. Though the retaining claw 55 of the partition plate 53 collides into the first discharged cartridge B1 during the return of the partition plate 53, it is enabled to shift from the operating posture to the retracting posture in spite of the urging force of the spring and prevent the first discharged cartridge B1 from accompanying the return of the partition plate 53 as illustrated in FIG. 15 (G) because the movement of the cartridge B1 is restricted by the stopper 62.

As a result, the next cartridge B2 is placed and retained in the cartridge holder 20 as illustrated in FIG. 15 (H). In the ensuant state, the return of the partition plate 53 to its home position causes the retaining claw 55 to resume the operating posture, catch hold of the second cartridge B2, and guide it to the cartridge holder 20 and place it therein. The drawing claw 54 similarly resumes the operating posture. At the same time, the returning plate 60 is actuated to guide the first cartridge which has been used and discharged and move it to the recess of the empty container 25B. Thereafter, the returning plate 60 is returned to its home position. Then, on the microfilm F of the second cartridge B2, the necessary image retrieval and copying described above are carried out.

By repeating the steps of FIGS. 15 (A) to 15 (H) as described above, the operations of loading, searching for retrieval, copying, and discharging are carried out on all of the cartridges B. When all these cartridges B are used and stowed in the other container 25B, this other container 25B is removed from the aforementioned loader 26. As a result, the container moving mechanism 44 is actuated and the moving member 45 is consequently caused to move the one container 25A which has been emptied and transfer it to the position formerly occupied by the other container 25B. Then, the one container 25A fulfils the function so far performed by the other container 25B, namely the role of accommodating the used cartridges B. Thereafter, the same function is to be fulfilled successively on the other containers which are destined to accommodate unused cartridges B and then stow itself in the aforementioned loader 26.

As respects the manner of searching for retrieval of the microfilm in the cartridge handled by the cartridge loader 26, fully automatic searching and semiautomatic searching are available. The term "fully automatic searching" refers to an operation which comprises preparatorily storing search data in the memory by the use of the retrieving board 24, automatically reading the data recorded on the label attached to the cartridge B, and comparing the two sets of data thereby automatically retrieving a desired image frame from the microfilm placed in the cartridge. The term "semiautomatic searching" refers to an operation which comprises causing the information on a stated image frame in a given cartridge to be injected into the memory by the use of the retrieving board 24 with respect to each of the cartridges involved.

Figure 16A:
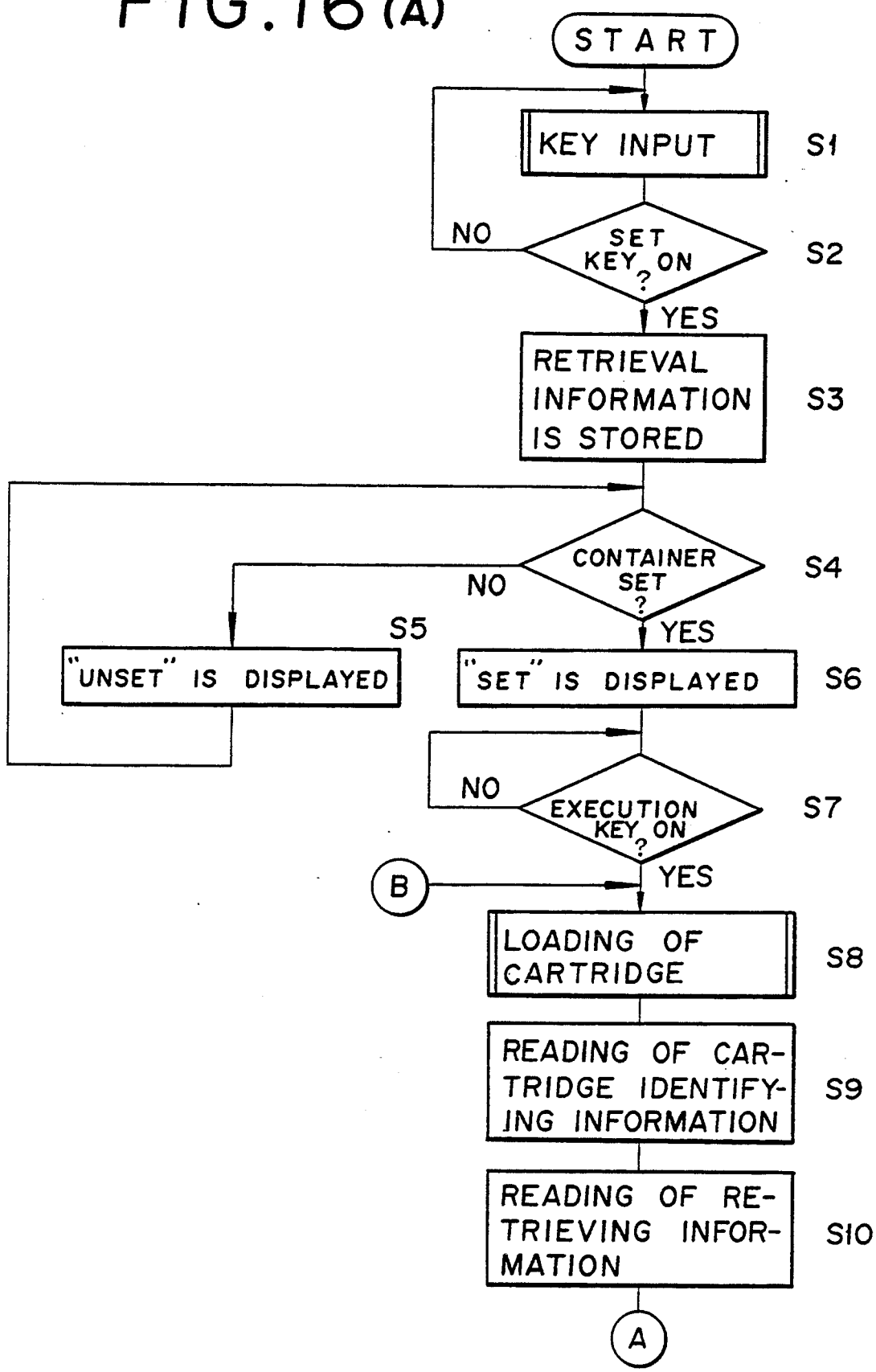
FIGS. 16 (A) and 16 (B) are flow charts illustrating the operating procedure of this reader/printer.
Figure 16B:
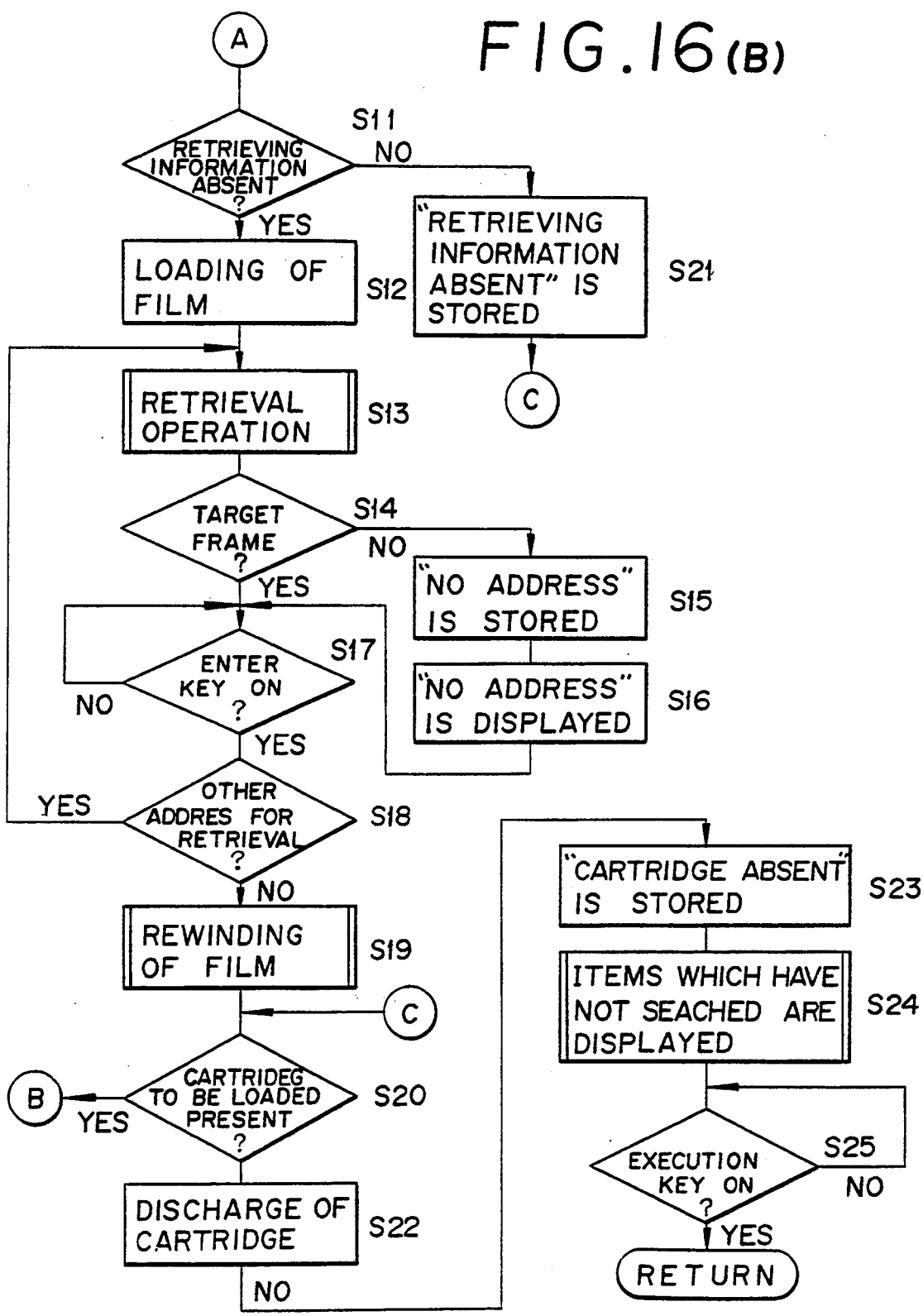

Now, the procedure to be followed in the aforementioned fully automatic searching of a microfilm by the use of the aforementioned cartridge loader 26 in the reader/printer will be described below with reference to the flow chart of FIG. 16.

Before the searching is made by the reader/printer, the container 25A is loaded with a plurality of cartridges B containing pertinent microfilms which have been extracted from the storage shelf (not shown). Specifically, a written instruction indicating cartridge numbers, frame numbers, etc. of the microfilms F containing pertinent images is put out by a computer. From a place of storage such as, for example, a storage shelf keeping in storage as many as hundred thousands of cartridges B, about ten to twenty cartridges B bearing stated cartridge numbers are extracted in accordance with the written instruction. These cartridges B are placed together with the written instruction in the container 25A. These cartridges B as a group are set upright on their sides on the floor surface 28 of the container 25A as closely superposed longitudinally along the groove 29. The container 25A containing the group of cartridges B in the manner described above is transported to the reader/printer and attached to the cartridge loader 26. With the reader/printer in the ensuant state, the following operation of searching is carried out.

Figure 2:
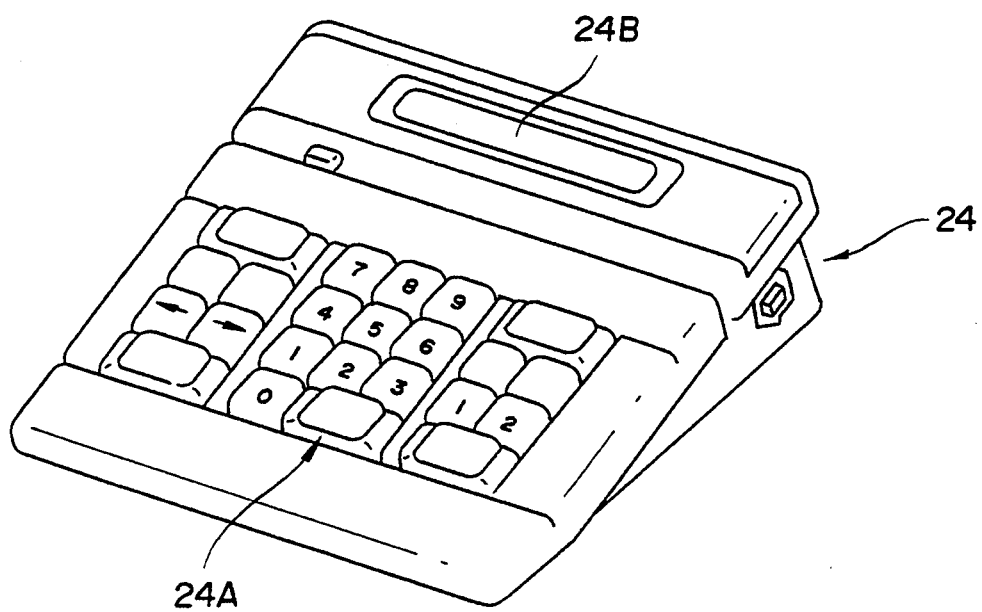
FIG. 2 is a perspective view illustrating a retrieving board of the reader/printer of FIG. 1.

First, the operator feeds the information on retrieval, i.e. the addresses of the positions occupied by images to be retrieved, in the reader/printer through the retrieving board 24 illustrated in FIG. 1 to FIG. 3 by consulting the written instruction held in the container 25A. This injection of the addresses is accomplished by inscribing the cartridge numbers and the frame numbers as the identifying information with a ten-key pad. When the 1,000th, 1,500th, and 1,600th frames of the cartridge, No. 20, and the 2,000th frame of the cartridge, No. 26, are to be retrieved, for example, the operator first depresses 20 in the ten-key pad, the ENTER key, 1000 in the ten-key pad, and the MEMORY key. Similarly, he inscribes "20, ENTER key, 1500, and MEMORY key, "20 ENTER key 1600 and MEMORY key," and "26, ENTER key, 2000, and MEMORY key," sequentially in the order mentioned. The addresses thus injected are displayed as 20-1000, 20-1500, 20-1600, and 26-2000 on the display part 24B at the respective moments of inscription (Step S1).

When the injection of the information on retrieval in accordance with the written instruction is completed and the SET key is depressed, the information on retrieval so far injected is stored in the memory part 72 through the medium of the CPU 71 (Step S2 and Step S3). Then, the judgment is formed on whether or not the cartridge has been set. The detecting sensor 41 illustrated in FIG. 6 bears the burden of this judgment. The signals issued from the detecting sensor 41 are transmitted via the CPU 74 to the CPU 71. The sign "UNSET" is displayed in the display part 24B of the retrieving board 24 when the container 25A having the cartridges set therein has not been attached to the aforementioned loader 26 and the sign "SET" is displayed therein when the attachment has been completed (Step S4 to Step S6). When the EXECUTION key is subsequently depressed, the signal designated by the depression of the EXECUTION key is forwarded from the CUP 71 to the CUP 74. As a result, the CPU 74 issues to the driving circuit 73 a command to effect the loading of cartridges and drives the cartridge loading mechanism so as to load the cartridge holder 20 with the first cartridge as described above with respect to FIG. 15 (A) to FIG. 15 (D) (Step S7 and Step S8). The code reading sensor 39A reads the cartridge identifying information which is symbolized as with bar codes and printed on labels attached to the cartridges in the cartridge holder 20. The information so read out is stored in the memory part 72 through the medium of the CPU 74 and the CPU 71. The cartridge numbers included in this information are displayed in the display part 24B of the retrieving board 24. When the identifying number of a pertinent cartridge is 20, for example, the numeral mark "20-" is displayed (Step S9). The CPU 74 reads the retrieving information put in for storage in the memory part 72 in the operation of Step S1 through the medium of the CPU 71.

When this retrieving information includes what pertains to the cartridges currently held inside the cartridge holder 20, the CPU 71 transmits to the CPU 74 a signal to convey the microfilm and the CPU 74 issues to the driving circuit 73 a command to drive the film conveying mechanism and, as a result, the loading of the microfilm is effected by the film carrier 3 and the operation for retrieval of the pertinent frame is carried out. During this operation of retrieval, the cartridge number and the address of the pertinent frame subjected to retrieval are displayed in the display part 24B. When the retrieving information of the pertinent frame subjected to retrieval happens to be the 1,000th frame of the cartridge, No. 20, for example, the numeral sign "20-1000" is displayed in the display part 24B. Further, since this operation of retrieval is a known operation in popular use, it ought to obviate the necessary for a detailed description (Step S11 to Step S13). When this operation of retrieval results in successful detection of the address or the frame aimed at, the image in this frame is projected on the screen 10. When this image is required to be copied, the operation for copying the image is initiated by the depression of the PRINT key, though this operation is not shown in the flow chart. As respects the operation of copying mentioned above, it is permissible to put to storage preparatorily in the memory part the information on choice as to the necessity for copying at the same time that the retrieving information is injected and to effect consequently the execution of the copying operation automatically. If the operation of retrieval fails to defect the target frame, the retrieving information is committed to storage in the memory part 72 and, at the same time, the sign "NO ADDRESS" is displayed in the display part 24B of the retrieving board 24. This display allows the operator to know readily a mistake in the input of the retrieving information and proceed to the next step of retrieval (Step S15 and Step S16).

When the retrieval of one frame is completed, that for the next frame aimed at can be started by depressing the ENTER key (Step S17). Where the operation of copying is automatically executed as described above and, therefore, the operator is not required to confirm for himself the image of the retrieved frame, however, the search for retrieval may be arranged to be started immediately after the operation of copying is completed. Where other address for retrieval has been put in by the depression of the ENTER key with respect to the cartridge of interest, the operations of Step S13 to Step S17 described above are repeated. When the ENTER key is depressed, the retrieving information of the next frame is displayed in the display part 24B. If the next frame covered by this retrieving information is the 1,500th frame of the cartridge, No. 20, for example, the numeral sign "20-1500" is displayed in the display part 24B (Step S18). When the search has been made on all of the frames in a given cartridge, a signal to rewind is issued from the CPU 71 to the CPU 74 and the film conveying mechanism 3 is consequently actuated to rewind the microfilm (Step S19). If there are cartridges yet to be loaded, the procedure of the steps illustrated in FIG. 15

(F) to FIG. 15 (H) is performed to effect both unloading of used cartridges and loading of the next cartridges and the operations of Step S8 to Step S19 are repeated on all of the cartridges held in the container 25A. The discretion between presence and absence of cartridges yet to be loaded is carried through in accordance with the signal to detect to be issued by the cartridge detecting sensor 39B (Step S20). When the rewinding has been already completed, the sign "REWIND" is displayed in the display part 24B (Step S19). If the retrieving information of the cartridges held in the container 25A is absent at Step S11, the fact that the pertinent retrieving information is absent is committed to storage in the memory part 72 and the processing is advanced to Step S20 (Step S21). When the search for retrieval is completed on the last one of the cartridges held in the container 25A, this last cartridge is discharged and the sign "SEARCH COMPLETED" is displayed in the display part 24B (Step S22). If the pertinent cartridge number is absent from the retrieving information which has been fed in, this retrieving information is stored in the memory part 72 (Step S23). Finally, the contents of the information stored at Step S15, Step S21, and Step S23 are displayed in the display part 24B. When the 4,500th frame of the cartridge, No. 20, is not found by the search, for example, this information is displayed with a numeral mark "20-4500 ABSENT". When a cartridge for which no retrieving information has been put in is set in place in the container 25A, the identifying number of this cartridge is displayed with a sign "28 ADDRESS ABSENT". When the retrieving information has been put in and the pertinent cartridge has not been set in place, a sign "26 ABSENT" is displayed. When a plurality of items have not been subjected to the searching performed as described above, necessary switch of the display is accomplished with the ENTER key (Step S24). When the EXECUTION key is then depressed, the whole operation of retrieval is completed and a sign "COMPLETED" is displayed in the display part 24B (Step S25). The recorder/printer is then readied for the next cycle of retrieving operations.

The series of retrieving operations are automatically carried out in the manner described above. The foregoing embodiment has been depicted as effecting the identification of cartridges B on the basis of the identifying information attached thereto. Even when this identification is effected on the basis of identifying information photographed in the microfilm, the series of retrieving operations can be arranged to be automatically carried out. In the system using the microfilm having the identifying information photographed therein, the sensor 23 primarily intended to detect blip marks may be adapted to read this retrieving information as well. Where the retrieval of image from the microfilm of this kind is to be automatically carried out, it is necessary first to load a suitable reading device with the microfilm and cause this device to read the identifying information in the microfilm. This necessity is fulfilled by causing the film loading operation of Step S12 in the flow chart shown in FIG. 16 to take place after the cartridge loading operation of Step S8 and, when the input of retrieving information on the pertinent cartridge is judged to be absent at Step S11 in the flow chart shown in FIG. 16, causing the result of this judgment to be stored, and returning the processing to Step S19 thereby executing the rewinding operation at Step S19. In this case, the sensor 23 plays the role of reading the identifying information.

When the operation of retrieval is completed on all of the cartridges in the manner described above, the cartridges which have undergone this operation are stowed in the container 25B. The container 25B which has accommodated the group of cartridges is then removed from the loader 26 and transported to the storage shelf, where the individual cartridges B held in the container 25B are returned to their pertinent positions in the storage shelf. The container 25B consequently emptied is used again for the purpose of accommodating cartridges B extracted from the storage shelf in accordance with a written instruction to be issued for subsequent image retrieval. Thus, it is repeatedly used for image retrieval.

The image projecting apparatus of this invention is improved in terms of efficiency of retrieval and efficiency of operation because the cartridges held in the container are automatically transferred from the container to the cartridge holder 20, the action of retrieval is immediately started after completion of the loading, and thereafter the loading and unloading of the cartridges is continuously carried out. Further, the image projecting apparatus of this invention can be easily embodied with the conventional cartridges because the identification of cartridges is arranged to be effected on the basis of labels attached to the rear sides thereof.

Now, the procedure followed in the semiautomatic retrieval of images from the microfilms held inside the cartridges will be described below with reference to the flow chart illustrated in FIG. 17.

First, the question on whether or not cartridges have been set in place is judged on the basis of a signal to be issued from the detecting sensor 41 illustrated in FIG. 6. The signal from the detecting sensor 41 is transmitted to the CPU 71 through the medium of the CPU 74 (S31). A sign "UNSET" is displayed in the display part 24B of the retrieving board 24 when the container 25A having cartridges set therein is attached to the cartridge loader 26 and a sign "SET" is displayed likewise when the container 25A is attached (S32 and S33). When the EXECUTION key is depressed, the signal generated in consequence of this depression of the EXECUTION key is forwarded from the CPU 71 to the CPU 74. The CPU 74, in response to the signal, issues to the driving circuit 73 a command to load cartridges and drives the cartridge loading mechanism and consequently causes the cartridge holder 20 to be loaded with the first cartridge as depicted in FIG. 15 (A) to FIG. 15 (D) (S34 and S35). The code reading sensor 39A reads the cartridge identifying information symbolized as with bar codes and printed on the labels attached to the cartridges held in the cartridge holder 20. The information thus read out of the labels is committed to storage in the memory part 72 through the medium of the CPU 74 and the CPU 71. Then, the cartridge numbers in the identifying information are displayed in the display part 24B of the retrieving board 24. When the identifying number of the cartridge held in the cartridge holder is 20, for example, a numeral sign "20-" is displayed. The display of the identifying number of the loaded cartridge effected in the manner described above enables the introduction of the retrieving information to be efficiently carried out (S36 and S37). When the EXECUTION key is then depressed and the CANCEL/STOP key is not depressed, a signal to convey a microfilm is forwarded from the CPU 71 to the CPU 74. Consequently, the CPU 74 issues to the driving circuit 73 a command to drive the film conveying mechanism 3 and the microfilm is loaded by the film conveying mechanism 3 (S38 to S40). Conversely, when the CANCEL/STOP key is depressed before the depression of the EXECUTION key is depressed, the fact that the CANCEL/STOP key has been depressed is committed to storage in the memory part 72 and the operation of Step S53 and the following operations are executed (S41). To effect the retrieval of the loaded cartridge, the operator consults the cartridge number displayed in the display part 24B and the target frame numbers indicated in the written instruction and injects the address indicating the position of the target image in the microfilm, namely the retrieving information, through the operating key part 24A of the retrieving board 24 illustrated in FIG. 1 to FIG. 3. This injection of the address is accomplished by inscribing the target frame number with the ten-key pad. When the 1,000th, 1,500th, and 1,600th frames in the cartridge are to be retrieved, for example, the numeral "1,000" is depressed on the ten-key pad and the MEMORY key is depressed. Similarly, the alphanumeric signs "1500, MEMORY KEY" and "1600, MEMORY KEY" are sequentially inscribed in the order mentioned. This operation of address injection can be carried out very efficiently by consulting the written instruction because the identifying numbers of the loaded cartridges are displayed in the display part 24B and further because the display part 24B is installed in close proximity to the operating key part 24A (S42). When the whole injection of the retrieving information according with the written instruction is completed as described above and then the SET key is depressed, the retrieving information injected thence is committed to storage in the memory part 72 through the medium of the CPU 71 illustrated in FIG. 14 (S43 and S44). The CPU 74 admits the retrieving information stored in the memory part 72 through the medium of the CPU 71 and performs the operation of retrieving the target frame in accordance with the retrieving information. Since this operation of retrieval is a known operation in popular use, it ought to obviate the necessity for a detailed description (S45). When this operation of retrieval results in successful detection of the target address or the target frame, the address of this frame is displayed in the display part 24B and the image in the frame is projected on the screen 10. When this image is required to be copied, the operation of copying is carried out by depressing the PRINT key, though this operation is not shown in the flow chart. Incidentally, as respects the operation of copying, this operation may be arranged so as to be automatically carried out by preparatorily lodging as an input the information on choice of necessity for copying at the same time that the retrieving information is injected. When the retrieved frame whose identifying number is to be displayed in the display part 24B happens to be the 1,500th frame in the cartridge, No. 20, for example, a numeral sign "20-1500" is displayed (S46 and S47). If the search fails to detect the target frame, the retrieving information is committed to storage in the memory part 72 and, at the same time, a sign "ADDRESS ABSENT" is displayed in the display part 24B of the controller 24. This display enables the operator to know easily a mistake in the input of the retrieving information and proceed to the next operation of retrieval (S48 and S49). When the retrieval of one frame is completed, the retrieval of the next frame can be started by depressing the ENTER key (S50). Where the operation of copying is automatically executed as described above and, therefore, the operator is not required to confirm for himself the image of the target frame, the retrieval of the next frame may be arranged to be started immediately after the operation of copying is completed. The depression of the ENTER key enables the operations of S45 to S50 described above to be repeated when other addresses for retrieval have been put in with respect to the pertinent cartridge. For addition of retrieving addresses of the target frames, the injection of these additional addresses can be accomplished in this step (S51). When the retrieval of all of the frames in the pertinent cartridge is completed, a signal to rewind is issued from the CPU 71 to the CPU 74 and, as a result, the film conveying mechanism 3 is actuated to rewind the microfilm (S52). If cartridges yet to be loaded are present, the operations illustrated in FIG. 15 (E) to FIG. 15 (H) are performed and the cartridges held in the container are discharged and, at the same time, the next cartridges are loaded. The operations of Step S35 to Step S52 are repeated on all of the cartridges held in the container 25A. The judgment on whether or not cartridges yet to be loaded are present is formed on the basis of the signal of detection from the cartridge detecting sensor 39B (S53). When the rewinding has been executed, a sign "REWIND" is displayed in the display part 24B (S52). When the retrieval is completed on the loaded cartridges, these cartridges are discharged and a sign "RETRIEVAL COMPLETED" is displayed in the display part 24B (S54). Finally, the contents of the information committed to storage at Step S41 and Step S48 are displayed on the display part 24B. If a cartridge with respect to which the search for retrieval has been cancelled is present, the identifying number of this cartridge is displayed with an alphanumeric sign "28 NO SEARCH." If the search fails to detect the 4500th frame of the cartridge, No. 20, this fact is displayed with an alphanumeric sign "20-4500 ABSENT." Incidentally, when a plurality of items which have escaped the search described above are present, the switch of the display is arranged to be effected by the ENTER key (S55). When the EXECUTION key is then depressed, the operations of retrieval are completed and a sign "COMPLETED" is displayed in the display part 24B (S32). The reader/printer is then readied for the next cycle of retrieving operations.

Figure 17A:
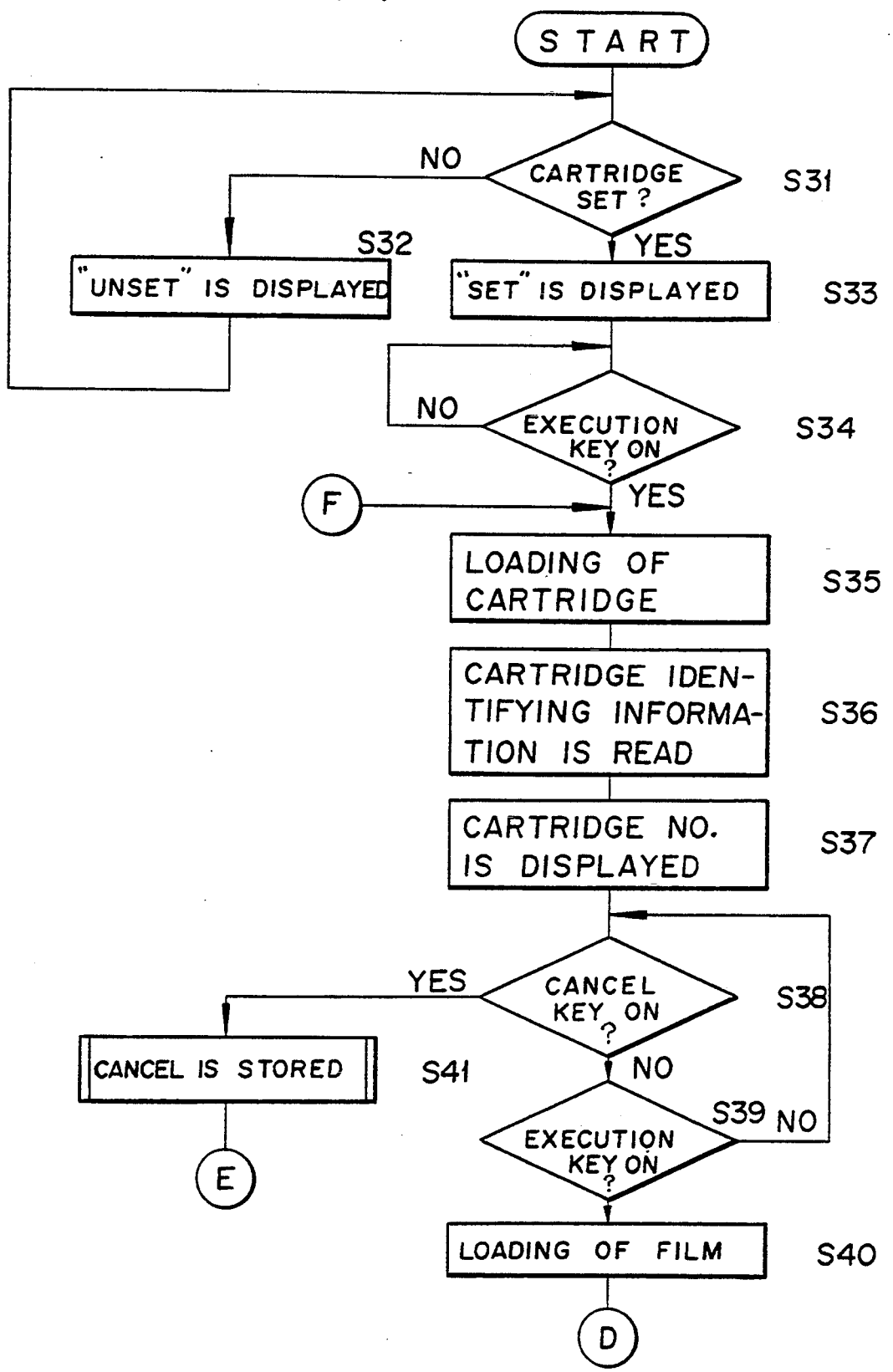
FIGS. 17 (A) and 17 (B) are flow charts illustrating the operating procedure of the reader/printer in another manner of operation.
Figure 17B:
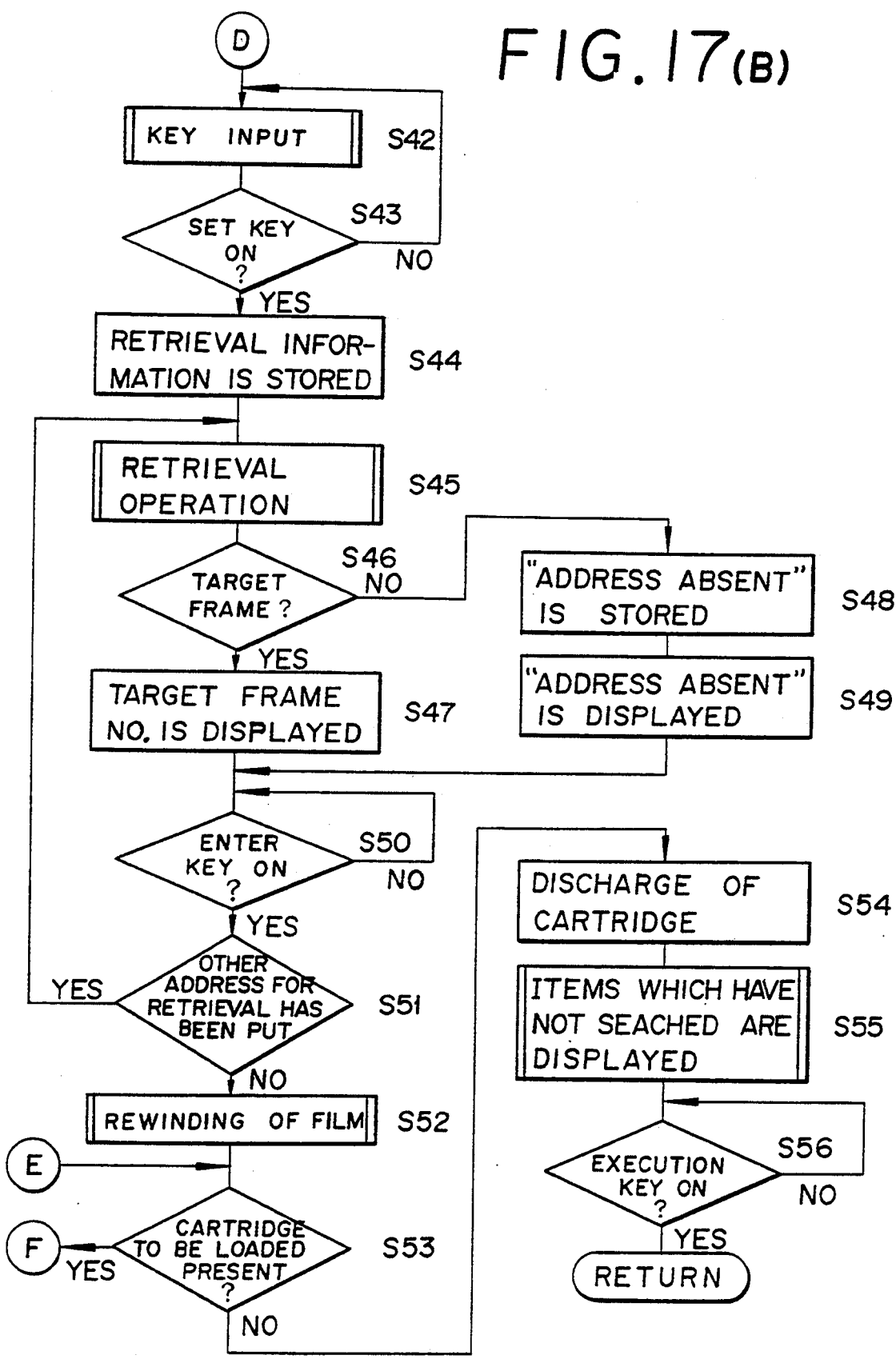

Even when the retrieval is semiautomatically carried out as illustrated in FIG. 17, the identification of cartridges may be attained by causing the sensor 23 to read the identifying information photographed in the microfilm instead of using labels containing such identifying information.

The foregoing embodiment has been depicted as using bar code symbols attached to the upper surfaces of cartridges as patterns for the identification of cartridges. Alternatively, the patterns may be those formed by magnetically recording the identifying information. Further, the embodiment has been depicted as using recorded identifying numbers of cartridges as the identifying information. Otherwise, other forms of identifying information such as records of dates, appellations of firms, and names of persons may be used on the condition that they are capable of specifying cartridges. The embodiment has been depicted as employing a mode of allowing the identifying information of cartridges to be read only after the holder has been loaded with the cartridges. Optionally, the reading of the identifying information of a plurality of cartridges held in the container may be arranged to be preparatorily effected at the time that the container holding the plurality of cartridges is attached to the cartridge loader. What is important is that the reading of the identifying information of cartridges should be effected before the cartridges are set in place in the holder.

Figure 18:
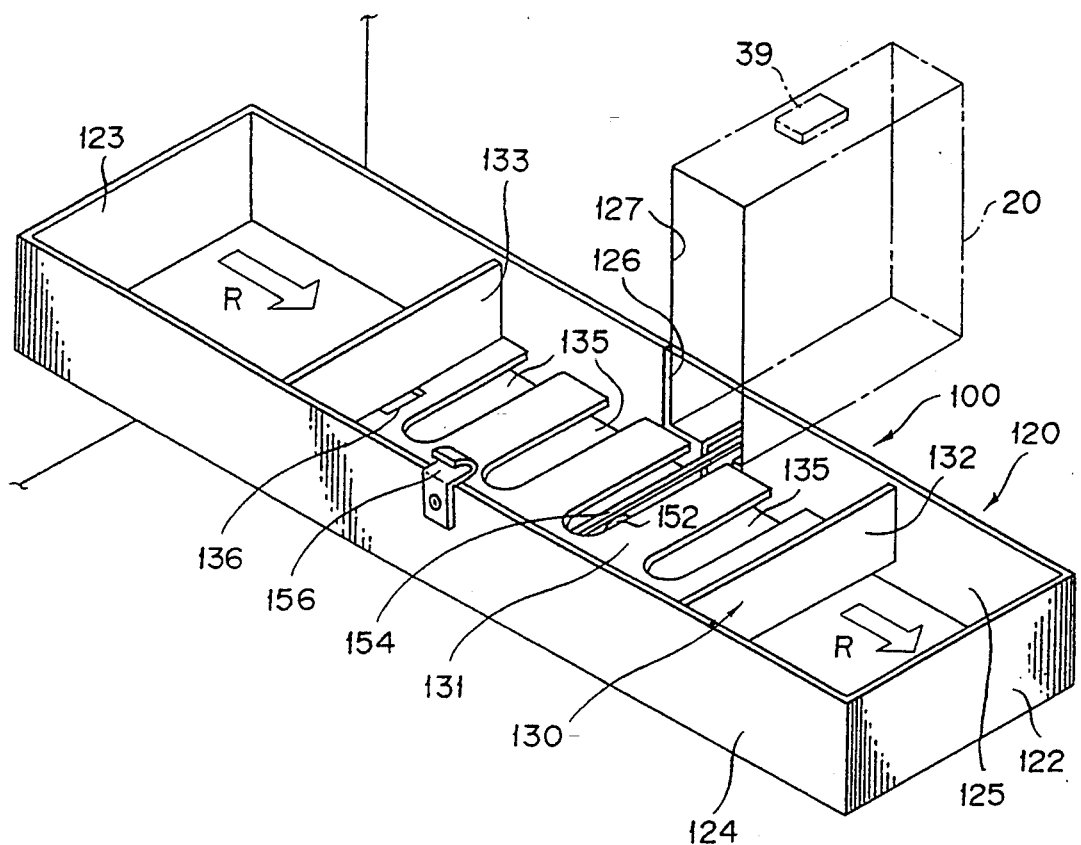
FIG. 18 is a perspective view illustrating a cartridge loader of other type to be attached to the reader/printer.

FIG. 18 is a diagram illustrating a cartridge loader 100 of another type to be provided for the reader/printer. This cartridge loader 100 is fixed contiguously to the cartridge holder 20 which is provided for the reader/printer. This loader 100 is so adapted as to allow attachment thereto of a container 101 illustrated in FIG. 19.

Figure 19:
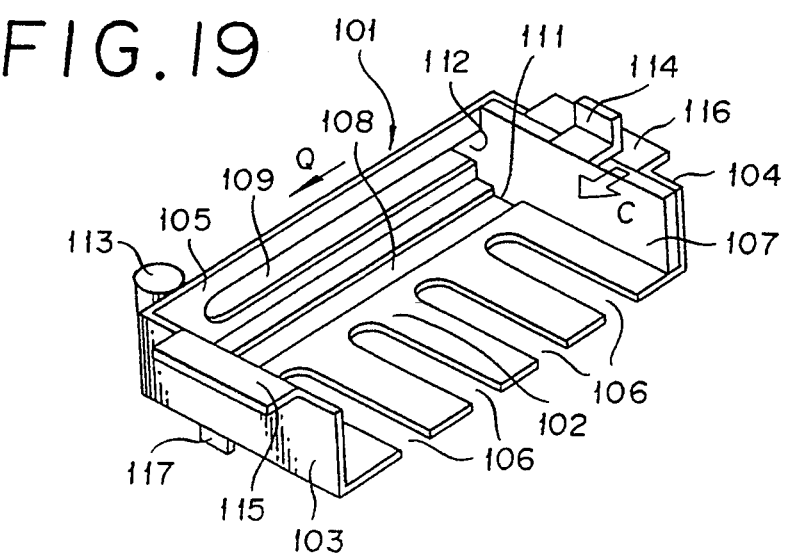
FIG. 19 is a perspective view illustrating a container to be provided for the cartridge loader illustrated in FIG. 18.

This container 101, as illustrated in FIG. 19, is formed of a bottom wall 102, a front wall 103, a rear wall 104, and a lateral wall 105. It is shaped like a rectangular box open in the upper part and the other lateral part. In the bottom wall 102 of the container 101, as many lateral slits 106 as accommodable cartridges B are formed as arranged in the direction of width. The lateral slits 106 are open at one end and are mutually parallel across an interval of 1 inch equalling the thickness of cartridges B to be held in the container 101 so that the lateral slits 106 coincide with the central parts of the bottom sides of these cartridges B.

This container 101 incorporates therein a retaining plate 107 substantially equal in size to the front wall 103 and the rear wall 104. This retaining wall 107 is adapted to slide between the two walls 103 and 104. In the bottom wall 102, a guiding groove 108 is formed along the length of the container. A guiding slit 109 is formed in the lateral wall 105 parallelly to the guiding groove 108. The retaining plate 107 is provided with a projection 111 adapted for engagement with the guiding groove 108 and a projection 112 for engagement with the guiding slit 109. The retaining plate 107, therefore, is enabled to slide as guided by the guiding groove 108 and the guiding slit 109. A spring case 113 is attached to the outside of the lateral wall 105. The spring case 113 houses a strip of leaf spring (not shown) wound in a coil. The leading end of this leaf spring is connected to the retaining plate 107. Owing to this arrangement, the retaining plate 107 is constantly urged with the resilient force exerted in the direction of an arrow mark Q, namely in the direction of the front wall 103.

A handle 114 to be used in moving the retaining plate 107 in spite of the resilient force in the direction of the rear wall 104 is fixed on the upper end of the retaining plate 107. Handles 115 and 116 to be used in carrying the container 101 are fixed respectively on the upper ends of the front and rear walls 103, 104 of the container. Positioning members 117 are projectingly fixed on the front and rear end parts of the lower side of the bottom wall 102 of the container 101 to allow location of the container 101 when the container 101 is attached to the cartridge loader 100. The attachment of the container 101 to the cartridge loader 100 is detected by virtue of the positioning member 117.

About four to ten cartridges B are accommodated in this container 101 and are transported jointly therewith. The insertion of the cartridges B in the container 101 is carried out with the handle 114 held fast in a hand and the retaining plate 107 moved toward and kept beside the rear wall 104 as illustrated in FIG. 19. The cartridges B are positioned in such a manner as to establish coincidence between the central parts of their respective bottom surfaces and the lateral slits 106 and are set upright on their sides and adjoined face to face inside the container 101. When the handle 114 is released from the operator's hand after completion of the insertion of the cartridges, the cartridges B are pressed by the retaining plate 107 urged by the spring member and are held in a stable state inside the container 101.

The cartridges B to be housed inside this container 101 are identical to those cartridges B used in the preceding embodiment and have a rolled strip of microfilm F contained therein. The aforementioned two types of cartridges are equally usable in the present embodiment.

The cartridge loader 100 is provided with a rectangular casing 120 which opens in the upper side and is composed of a bottom wall 121, a front wall 122, a rear wall 123, and lateral walls 124, 125 as illustrated in FIG. 18. The lateral wall 125 has a notch 126 formed approximately in the central part in the longitudinal direction thereof. A cartridge loading mouth 127 is formed in the cartridge holder 20 of the reader/printer. The casing 120 is fixed in such a posture on the front side of the reader/printer that the notch 126 and the cartridge loading mouth 127 coincide with each other.

Figure 20:
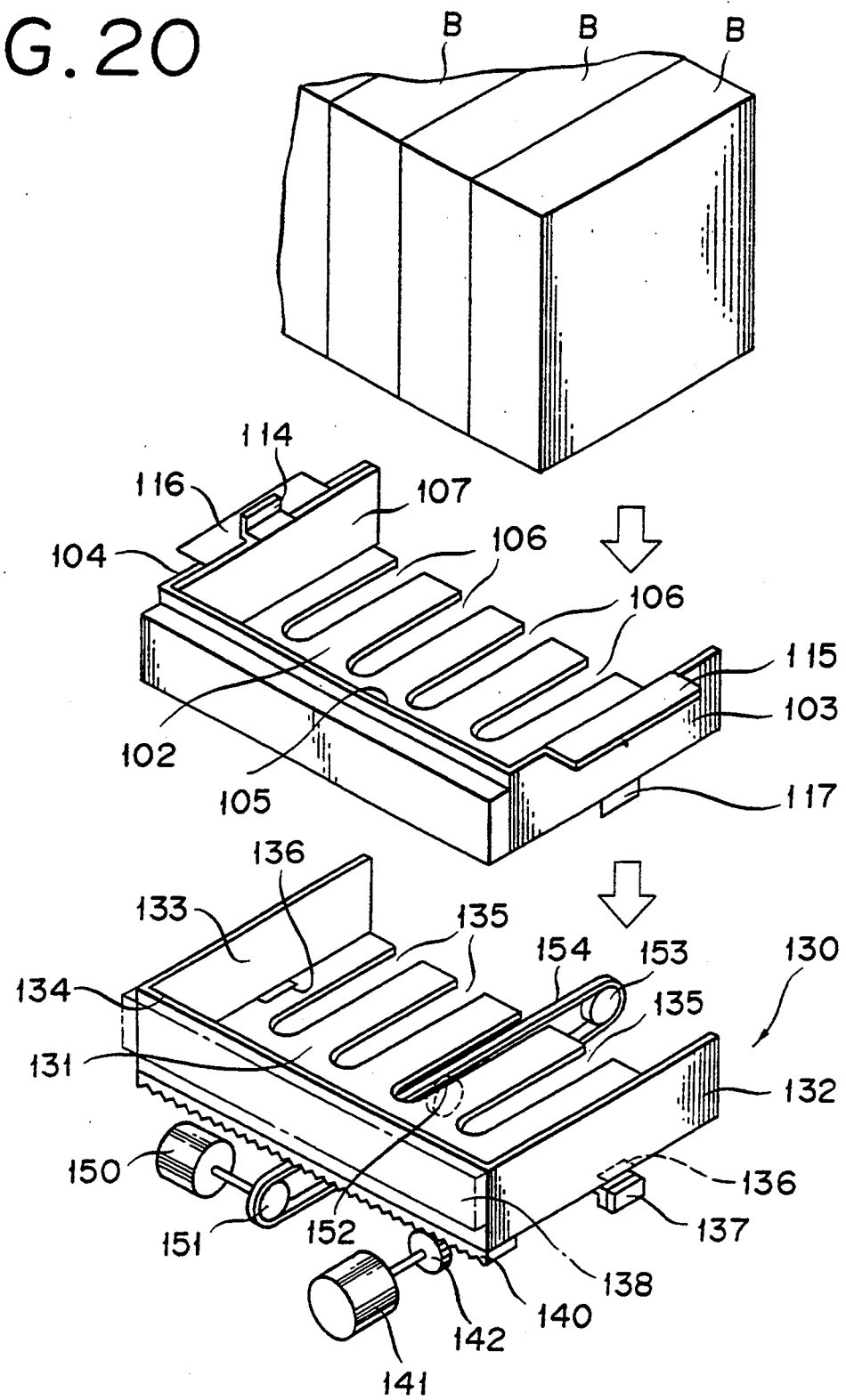
FIG. 20 is a perspective view illustrating a slide box to be incorporated in the cartridge loader, the container to be provided for the slide box, and cartridges to be accommodated in the container.

Inside the casing 120, a sliding box 130 is fitted so as to slide freely in the longitudinal direction or the direction of an arrow mark R. The sliding box 130, as illustrated in FIG. 20, is composed of a bottom wall 131, a front wall 132, a rear wall 133, and a lateral wall 134 and, therefore, shaped like a box open in the upper side and the other lateral part. This sliding box 130 has a size enough to hold therein the container 101. The container 101 is accommodated in the sliding box 130 in such a manner that the lateral wall 105 thereof overlies the lateral wall 134 of the sliding box 130. In the bottom wall 131 of this box 130, as many lateral slits 135 as the lateral slits 106 in the bottom wall 102 of the container 101 are formed in an identical shape. These lateral slits 135 coincide with the lateral slits 106 and confront the central parts of the bottom sides of the cartridges B.

Positioning holes 136 in which the two positioning members 117 formed in the bottom wall 102 of the container 101 are inserted when the container 101 is housed in the box 130 are formed in the opposite end parts of the bottom wall 131. To the opposite end parts of the bottom wall 131, sensors 137 intended for detection of the insertion of the positioning members 117 in these holes 136 are attached. With these sensors 137, the question on whether the container 101 has been set inside the box 130 or removed therefrom is discriminated.

Figure 21:
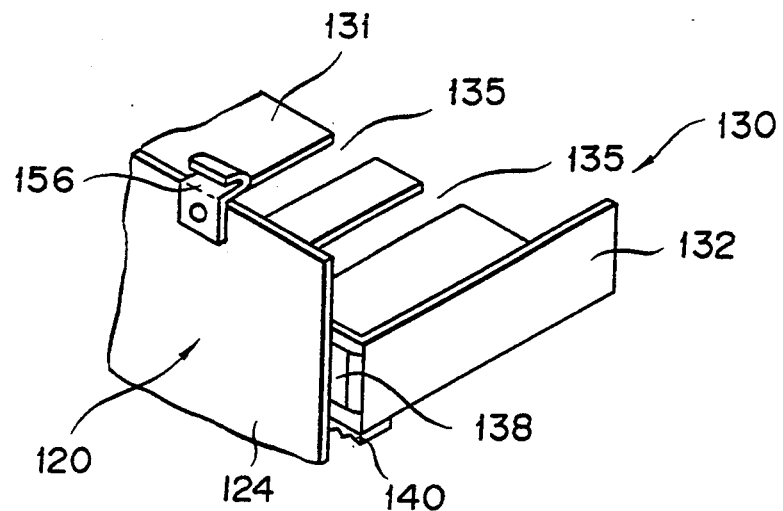
FIG. 21 is a perspective view illustrating part of the slide box.

A slide rail 138 is formed on the outer surface of the lateral wall 134 of the box 130 as illustrated in FIG. 20. This rail 138 is adapted to come into sliding contact with the lateral wall 124 of the casing 120 as illustrated in FIG. 21. The box 130 in the state holding therein the container which in turn is housing the cartridges B, therefore, is enabled to slide in the direction of the arrow mark R inside the casing 120, with the open lateral side thereof directed to the loading mouth 127. For the purpose of imparting a reciprocation in the direction of the arrow mark R to the slide box 130, a pinion gear 142 fixed on the shaft of a motor 141 is meshed with a rack gear 140 formed on the bottom wall 131.

The sliding box 130 is set at its home position when it is not loaded with the container and immediately after it is loaded with the container. This home position falls toward the left so much from the position thereof illustrated in FIG. 18 that the closest one to the front wall 132 of the lateral slits 135 formed in the slide box 130 coincides with the inserting mouth 127. In this position, the one of the plurality of cartridges B held in the container 101 which is lying in contact with the front wall 103 of the container 101 is opposed to the inserting mouth 127.

The sliding box 130 is moved from its home position by the motor 141 in the direction of the arrow mark R within the casing 120 stepwise with a fixed distance, 1 inch, for example, which is the thickness of one cartridge B. As a result, the cartridges B in the container 101 are sequentially positioned at the inserting mouth 127 because the sliding box 130 is moved stepwise with a stated pitch jointly with the container 101 holding the cartridges B therein. After the sliding box 130 has moved to its largest forward reach, it is moved in the direction opposite to the direction of the arrow mark R and returned to the home position by the reverse rotation of the motor 141.

Figure 22:
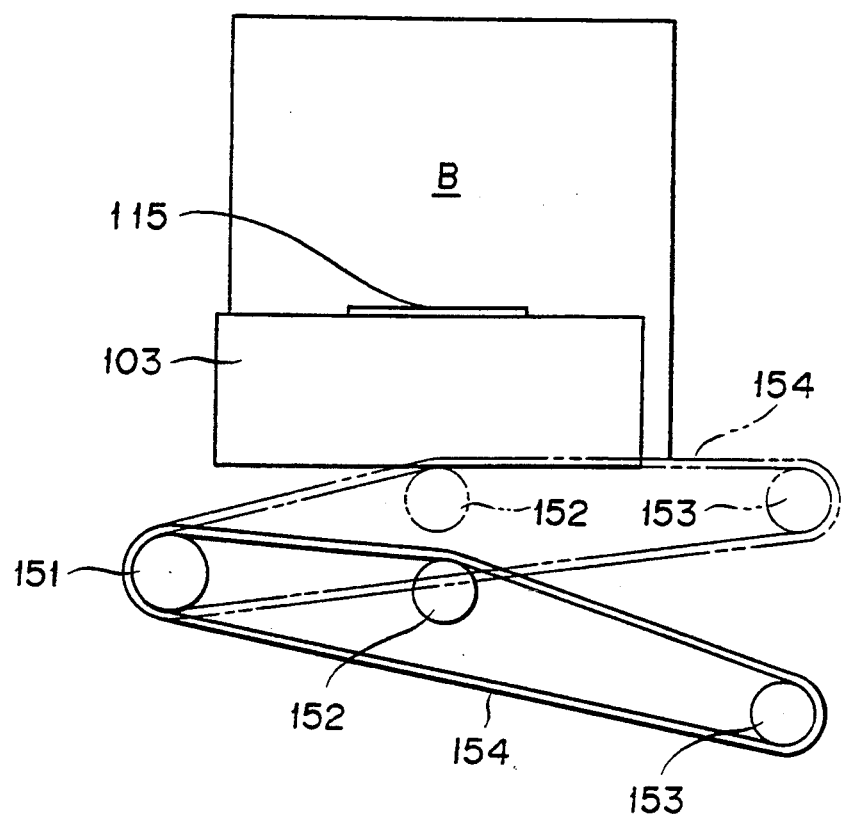
FIG. 22 is a side view illustrating a conveyor belt to be provided in the cartridge loader.

FIG. 20 and FIG. 22 illustrate a cartridge moving mechanism which serves the purpose of extracting the cartridges B from the container, setting them in the cartridge loader 20 and, at the same time, discharging the used cartridges B from the loader 20 and returning them to the container 101. A first pulley 151 is fixed on the shaft of a motor 150 which is seated in the casing 120 as illustrated in FIG. 20. This first pulley 151 is located below the lateral wall 134 of the sliding box 130. A second pulley 152 is set rotatably inside the casing so as to coincide with one of the lateral slits 135. Further, a third pulley 153 is rotatably set below the cartridge holder 20. A conveyor belt 154 is passed around these pulleys 151 to 153. The second pulley 152 is adapted to be moved by the moving mechanism (not shown) to the retracting position separated from the sliding box 130 as indicated by a solid line shown in FIG. 22 and to the operating position at which the conveyor belt 154 is positioned inside the lateral slit 106 and brought into contact with the rear side of the cartridge B as indicated by an imaginary line. The third pulley 153 is likewise adapted to be moved by the moving mechanism (not shown) to the retracting position separated from the holder 20 as indicated by a solid line in FIG. 22 and the position opposed to the lower side of the holder 20 as indicated by an imaginary line.

For the purpose of loading the cartridge holder 20 with the cartridges B held in the container 101, the pulleys 152, 153 and the conveyor belt 154 are moved to the position indicated by the imaginary line in FIG. 22 and, with the conveyor belt 154 held in contact with the bottom surface of the cartridge B, the motor 150 is set into motion in the direction of conveyance. As a result, the cartridges B are taken out of the container 101 and inserted through the inserting mouth 127 and set in place inside the cartridge holder 20. By setting the conveyor belt 154 in the posture indicated by an imaginary line in FIG. 23 and reversing the rotation of the motor 150, the used cartridges B are returned on the conveyor belt 154 to the home position inside the container 101. The motor 150 is not driven and the cartridges B are not moved when the conveyor belt 154 remains in the retracting position indicated by the solid line.

To the lateral wall 124 of the casing 120, a spacer 156 produced by bending a leaf spring is attached in the position opposite the inserting mouth 127. After the cartridges B have been introduced through the inserting mouth 127 and set in place inside the cartridge holder 20, this spacer 156 elastically deforms and finds its way into a gap formed between the residual cartridges B adjoining those in the cartridge holder 20 and, consequently, holds the operating posture. As a result, it continues to retain the gap in a size equalling the width of one cartridge B. When one cartridge B is taken out of the cartridge holder 20 and inserted in the gap retained by the spacer 156, this cartridge B pushes the spacer 156 and causes it to resume the retracting posture. The resilient force of the spacer 156 is set at a magnitude weaker than the conveying force of the conveyor belt 154. The spacer 156 is set at a resilient force such that when it remains in the retracting posture, it is incapable of moving the corresponding cartridge B which is held in the container 101.

Now, the procedure to be followed in effecting the search on the microfilm by the use of the cartridge loader 100 will be described below.

A written instruction designating the cartridge numbers, the frame numbers, etc. of a microfilm F having recorded therein images to be retrieved is issued from the computer. The operator consults this written instruction and selects pertinent cartridges B from as many as hundred thousands of cartridges B kept in a place of storage such as a storage shelf. About four to ten cartridges, for example, designated in the written instruction are placed in the container 101. The individual cartridges B are accommodated in the container 101 as set upright on their sides on the bottom wall 102 of the container and adjoined face to face as illustrated in FIG. 20. These cartridges B assume a state in which their respective lower parts are nipped between the front wall 103 and the retaining plate 107.

The container 101 which has accommodated the cartridges B is transported to the reader/printer and set fast in place inside the sliding box 130 of the cartridge loader 100 which is attached to the reader/printer. At this time, the container 101 is set in place in such a manner that the lateral wall 105 adjoins the lateral wall 134 of the sliding box 130 and, at the same time, the lateral slips 106 coincide with the lateral slits 135. The location of the container 101 relative to the sliding box 130 is accomplished by the insertion of the positioning member 117 in the positioning hole 136. The fixation of the container 101 in the sliding box 130 is ascertained by the sensor 137 detecting the positioning member 117.

Since the sliding box 103 assumes its home position after the container 101 has been fixed in the sliding box 130, the one of the lateral slits which falls closest to the front wall 132 of the sliding box 130 is opposed to the notch 126 and the inserting mouth 127. At this time, the one of the lateral slits 106 closest to the front wall 103 of the container 101 and the first cartridge B closest to the front wall 103 as well are opposed to the inserting mouth 127.

For the fully automatic image retrieval, the operator puts in data for retrieval by the use of the retrieving board 24 illustrated in FIG. 2 and FIG. 3 while consulting the written instruction. In the place of the fully automatic method described above, the semiautomatic method which relies on the operator putting in the retrieving data by the use of the retrieving board 24 while comparing the labels on the cartridges B with the written instruction may be employed in effecting the input of the retrieving information. In the case of the semiautomatic retrieval, the operator puts in the retrieving data on the first cartridge B while consulting the written instruction when the sliding box 130 is occupying its home position or when the first cartridge B has assumed the position opposite that of the inserting mouth 127.

When the signal to start retrieval is put in, the pulleys 152, 153 are moved from the retracting positions indicated by the solid line to the operating positions indicated by a two-dot chain line both illustrated in FIG. 22 and, at the same time, the motor 150 is set into rotation in the normal direction. The conveyor belt 154 in motion in the loading direction passes through the lateral slits 106, 135, comes into contact with the bottom surface of the cartridge B, extracts this cartridge B from the container 101, introduces it through the inserting mouth 127, and sets it in place inside the cartridge holder 20. At the same time, the spacer 156 is displaced by the resilience of its own into the operating posture and secures a gap of the size of the first loaded cartridge B between the other adjacent cartridges in the container 101. When the loading is completed, the motor 150 stops and the pulleys 152, 153 retract to the positions indicated with the solid line in FIG. 22.

The reader/printer starts retrieval when the sensor (not shown) finds the fact that the first cartridge B has been set in place inside the cartridge holder 20.

In the case of the fully automatic retrieval, the sensor provided in the cartridge holder 20 reads the data displayed on the label attached to the loaded cartridge B. By causing a microcomputer, for example, to compare the data of the label read by the sensor with the retrieval-designating data put into the memory by the manipulation of the retrieving board 24, the retrieval regarding the coinciding data or the retrieval of the frame of a pertinent image recorded in the microfilm F in the cartridge B is carried out. In the case of the semiautomatic retrieval, the retrieval of the frame of a pertinent image in the microfilm F is carried out on the basis of the retrieval-designating data put in solely with respect to the loaded cartridge B.

This retrieval is executed by a procedure which comprises loading the film carrier 3 illustrated in FIG. 4 with the microfilm F from the rewinding reel 21 of the cartridge B, reciprocally conveying the microfilm F between the rewinding reel 21 and the winding reel 19, and causing the sensor to detect the blip marks inscribed in the image frames. The pertinent image is brought to a stop in the part of the retaining glass sheets, projected on the screen 10, and projected on the photosensitive body 16 to be copied on the recording paper P.

Now, the operation of returning the cartridge B from the cartridge holder 20 to the container 101 will be described.

When the operations of retrieving and copying are completed on the first cartridge B and the microfilm F is taken up on the rewinding reel 21, the motor 150 is set into motion in the reverse direction and, at the same time, the pulleys 152, 152 are moved from the retracting position indicated by the solid line to the operating position indicated by the two-dot chain line illustrated in FIG. 22.

When the semiautomatic retrieval is employed, the operator reads the data recorded on the label of the second cartridge B and puts in the relevant retrieval-designating data while the microfilm F is being taken up on the rewinding reel.

When the motor 150 is set into motion in the reverse direction, the first cartridge B which has been used within the cartridge holder 20 is returned to the home position, namely the gap secured by the spacer 156, and set in place there by the conveyor belt 154 which comes into contact with the bottom surface of the cartridge B. This spacer 156 is pressed by the returned cartridge B and consequently displaced to the retracting posture. After this return of the cartridge B, the motor 151 stops and the pulleys 152, 153 return to their retracting positions.

After the first cartridge B has been returned, the second cartridge B is moved to the position opposite the inserting mouth 127. This motion is effected by rotating the motor 141 in a stated revolution number thereby causing the sliding box 130 to be moved in a distance equalling the thickness of one cartridge B in the direction indicated by the arrow mark R shown in FIG. 18. The operations of loading, retrieving, copying, and returning are carried out on the second cartridge B in the same manner as on the first cartridge B described above. After these operations have been carried out on all of the cartridges held in the container 101 and these cartridges have been returned as used to the container 101, the container 101 is removed from the sliding box 130. After the other container holding therein unused cartridges B is set in place in the sliding box 130, the removed container 101 is transported to the place of its storage and the individual cartridges B in this container are returned to the pertinent places of storage. The container 101 emptied consequently is loaded again with other cartridges B and put to use again. The papers on which the pertinent images have been copied are distributed to the relevant sections.

The container 101 and the sliding box 130 are jointly moved intermittently by the motor 141 and the cartridge B to be used is located opposite the inserting mouth 127 of the cartridge holder 20 and automatically set in place in the holder by the conveyor belt 154. The cartridge B which has been used is taken out of the cartridge holder 20 by the conveyor belt 154 and returned automatically into the container 101.

Heretofore, the retrieval of an image recorded in the microfilm has been effected by a series of such operations as extracting, transporting, loading, unloading, and returning the pertinent cartridge. The present invention accomplishes automation of the operations of loading and unloading without changing the flow of the series of operations mentioned above. The conventional cartridge loader for storage of cartridges has a capacity for about 100 to 200 cartridges at most. The present invention is usable even when such a large number of cartridges as more than one hundred thousand are to be stored.

The fully automatic retrieval with the reader/printer using the cartridge loader 100 is effected by preparatorily putting in the retrieval-indicating data by the use of the retrieving board 24, causing the data indicated on the label of each of the loaded cartridges to be read automatically, comparing the two sets of data, and carrying out retrieval concerning the coinciding data, namely retrieval of the frames of pertinent images in the microfilm F. This label is pasted to the upper surface of the cartridge and has a bar code printed thereon. In the semiautomatic method of retrieval, the retrieval of a pertinent image in the microfilm can be performed by the use of this cartridge loader 100. In this case, the operation of retrieval is easily carried out because the label of the cartridge held inside the container 101 can be visually observed from the front side of the reader/printer.

Figure 23:
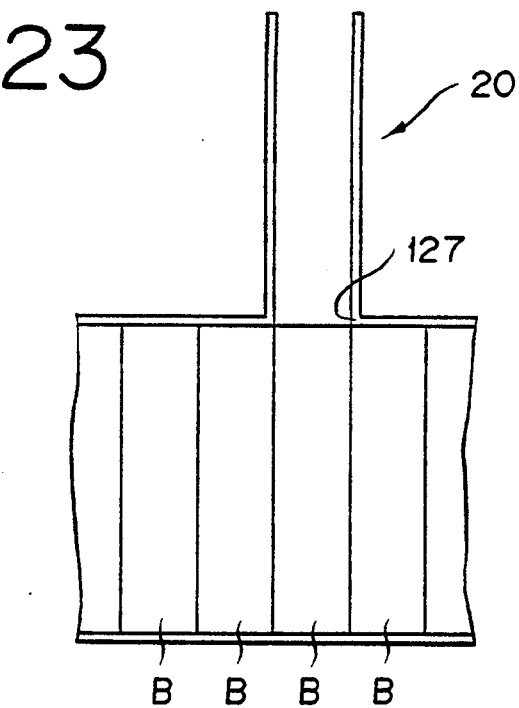
FIG. 23 is a plan view illustrating the cartridges held inside the container and a cartridge insertion hole.
Figure 24:
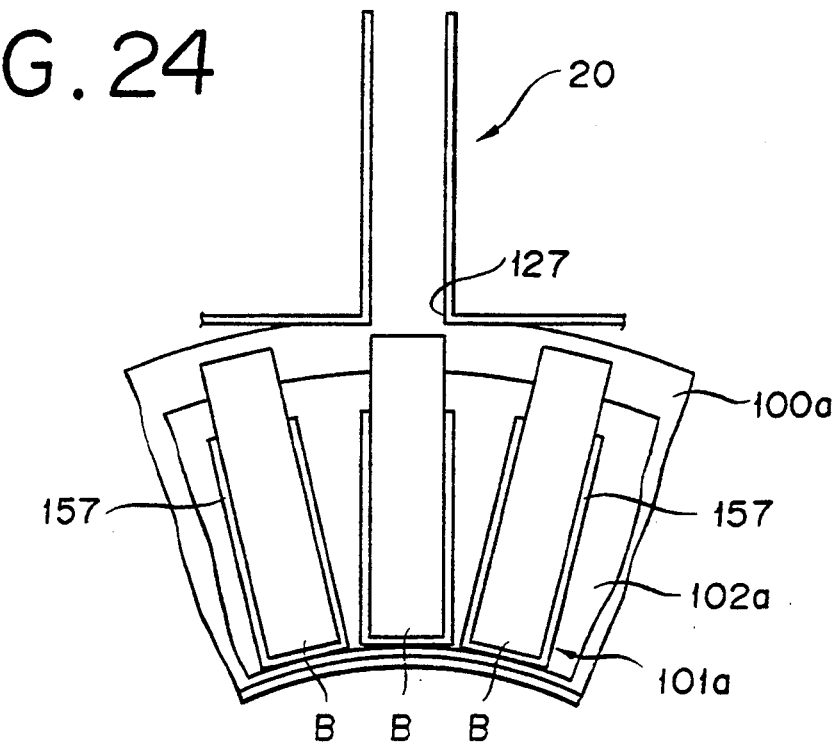
FIG. 24 is a plan view illustrating the part of a modified version of the container corresponding to the part illustrated in FIG. 23.

FIG. 23 is a plan view illustrating part of the cartridge loader 100 in the state accommodating therein cartridges B and FIG. 24 is a plan view illustrating part of a modified version of the cartridge loader 100a similarly to FIG. 23.

The preceding embodiment has been depicted as causing the sliding box 130 holding cartridges therein to be reciprocated in a straight line. In the cartridge loader illustrated in FIG. 24 which is shaped like a doughnut, many cartridges are radially accommodated inside a container 101a whose bottom wall 102a has an arcuate shape. Inside this container 101a, as many holders 157 for supporting a cartridge B as the cartridges to be used are installed. A slide box for retaining the container 101a has a similar arcuate shape. The container 101a is adapted to be rotationally moved in conjunction with the sliding box inside a cartridge loader 100a. With the cartridge loader 100a of the type illustrated in FIG. 24, the loading and unloading of cartridges can be automatically carried out as described above.

We claim:

1. A cartridge loading device for attachment to an image projecting apparatus serving to project an image recorded in a microfilm held in a cartridge, said cartridge loading device comprising:
    a container for accommodating a plurality of cartridges, said container being detachable from a body of said image projecting apparatus;
    a container loader for supporting said container, said container loader including a supporting portion for supporting said container and including means for detachably attaching said container thereto, wherein the supporting portion is exposed to the outside so that said container attached to the supporting portion is easily detached therefrom and from said body of said image projecting apparatus; and
    cartridge moving means for sequentially extracting said cartridges from said container attached to said container loader and for setting the extracted cartridges in place in an image reading position provided for said image projecting apparatus and located externally of said container.

2. A cartridge loading device according to claim 1, which further comprises container moving means for moving said container attached to said container loader in a stated direction and, at the same time, sequentially causing said cartridges held in said container to be opposed to said image reading position whereby said cartridge moving means further serves to extract said cartridges from said image reading position and move said cartridges to the interior of said container.

3. A cartridge loading device comprising:
    a first container for accommodating a plurality of cartridges;
    a first container loader for detachably supporting said first container;
    a second container identical in shape with said first container;
    a second container loader for detachably supporting said second container; and
    cartridge moving means for sequentially extracting said cartridges from said first container attached to said first container loader, setting the extracted cartridges in an image reading position provided for said image projecting apparatus, extracting cartridges from said image reading position and transferring them to said second container attached to said second container loader.

4. A cartridge loading device according to claim 3, wherein said cartridge moving means comprises a first moving member for moving said cartridges accommodated in said first container to a stated position outside said container, a second moving member for holding said cartridges moved to said stated position by said first moving member, setting said cartridges in place in said image reading position, and unloading said cartridges from said image reading position, and a third moving member for moving to said second container said cartridges unloaded from said image reading position by said second moving member.

5. A cartridge loading device according to claim 4, wherein said second moving member comprises a partition plate for partitioning a cartridge to be loaded from another cartridge to be subsequently loaded, and a claw disposed upright perpendicularly to the surface of said partition plate and for taking hold of said cartridge, said partition plate being provided on the side allowing attachment thereto of said cartridge with a reel retainer for retaining in place a reel for cartridges.

6. A cartridge loading device according to claim 5, wherein said claw provided for said partition plate of said second moving member is adapted to move to a first position for regulating the motion of said cartridge in the direction of said image reading position and a second position not regulating the motion of said cartridge, whereby said claw at said second position enables said cartridge to be directly attached to or detached from said image reading position manually without actuating said cartridge moving means.

7. A cartridge loading device according to claim 4, wherein said container comprises a base plate for supporting cartridges and a lateral plate for guiding the lower part of the lateral surface of a cartridge supported on said base plate toward the image reading position.

8. A cartridge loading device according to claim 3, which further comprises container moving means for moving to said second container loader said container attached to said container loader after detachment of the second container from the second container loader.

9. A cartridge loading device according to claim 8, which further comprises cartridge sensing means for sensing the presence or absence of a cartridge within said container, container sensing means for sensing the condition of attachment of said container to said second container loader, and control means for actuating said container moving means when said cartridge sensing means senses the absence of a cartridge within said container and, at the same time, said container sensing means senses the absence of attachment of said container to said second container loader.

10. A cartridge loading device, comprising:
    first and second containers for accommodating a plurality of cartridges;
    a first container loader for allowing detachable attachment thereto of said first container;
    a second container loader for allowing detachable attachment of said second container; and
    cartridge moving means for sequentially extracting said cartridges from said first container attached to said first container loader, moving said cartridges to a specified position wherein said cartridge is allowed to be used, and moving used cartridges to said second container attached to said second container loader.

11. An image projecting apparatus for handling a plurality of microfilms each of said plurality of microfilms having plural images to be projected and each of said plurality of microfilms having identifying information thereon to identify the microfilms, which image projecting apparatus comprises:

mounting means for mounting a container capable of accommodating a plurality of said microfilms;

moving means for sequentially moving to an image reading position said microfilms accommodated in said container;

identifying information reading means for reading said identifying information of said microfilms;

retrieving information input means for inputting the information to be used for retrieval of images recorded in said microfilms; and means for retrieving and projecting desired images from microfilms which are placed in said image reading position in accordance with said identifying information read by said identifying information reading means and on the basis of retrieving information inputted by said retrieving information input means.

12. An image projecting apparatus for handling a plurality of microfilms each of said plurality of microfilms having plural images to be projected and each of said plurality of microfilms having identifying information thereon to identify the microfilms, said image projecting apparatus comprising:

mounting means for mounting a container capable of accommodating a plurality of said microfilms;

moving means for sequentially moving to an image reading position said microfilms held in said container;

identifying information reading means for reading said identifying information of microfilms held in said image reading position;

display means for displaying the identifying information read by said identifying information reading means;

retrieving information input means for inputting information allowing retrieval of images recorded in said microfilms; and means for retrieving and projecting desired images from said microfilms held in said image reading position on the basis of retrieving information inputted by said retrieving information input means.

13. An image projecting apparatus according to claim 12, wherein said display means and said retrieving information input means are provided in an operating part of said image projecting apparatus.

14. A cartridge loading device provided in an image projecting apparatus for projecting an image recorded in a microfilm held in a cartridge, said cartridge loading device comprising:

a container for accommodating a plurality of cartridges;

a container loader for detachably supporting the container in a body of the image projecting apparatus in a state wherein a part of the container is exposed from the body of the image projecting apparatus, so that a container attached to the container loader is easily detached therefrom; and cartridge moving means for sequentially moving the cartridges out of the container to an image reading position provided for the image projecting apparatus.

15. A method performed in an image projecting apparatus for retrieving and projecting images recorded in a microfilm held in a cartridge provided with identifying information, said method comprising the steps of:

mounting a plurality of cartridges in the image projecting apparatus;

inputting first information and second information into the image projecting apparatus, wherein said first information is for specifying a desired cartridge and said second information is for specifying a position of a desired image;

sequentially moving the cartridges to an image reading position;

searching the desired cartridge by reading identifying information of the cartridges in the image reading position and then determining whether the identifying information coincides with the first information; and retrieving and projecting the desired image from the microfilm in the searched cartridge based on the second information.

16. A method performed in an image projecting apparatus for retrieving and projecting images recorded in a microfilm held in one of a plurality of cartridges, each of said plurality of cartridges being provided with identifying information on an outer surface thereof to identify the cartridge, said method comprising the steps of:

mounting said plurality of cartridges in the image projecting apparatus;

sequentially moving the cartridges to an image reading position;

reading said identifying information on the outer surface of the cartridges in the image reading position;

displaying the identifying information read from the cartridges;

inputting into the image projecting apparatus retrieving information for use of retrieval of a desired image recorded in a microfilm held in one of the cartridges identified by the identifying information thereon; and retrieving and projecting the desired image from the microfilm held in the identified cartridge based on the retrieving information input into the image projecting apparatus.

17. A cartridge loading device for an image projecting apparatus comprising:

an attaching portion for selectively attaching one of a plurality of containers, said attaching portion including means for detachably attaching said one of a plurality of containers thereto so that said container is easily detachable therefrom and from a body of said image projecting apparatus, said one of a plurality of containers accommodating a plurality of cartridges;

a cartridge holding portion located externally of said container for holding a cartridge to project an image in a film accommodated in the cartridge; and cartridge moving means for sequentially extracting said cartridges from said container attached to said attaching portion and for setting the extracted cartridges to said cartridge holding portion.

18. A cartridge loading device according to claim 17, wherein said attaching portion is exposed to the outside.

19. A cartridge loading device according to claim 17, which further comprises locking means for locking a container attached to said attaching portion.

20. A method performed in an image projecting apparatus for retrieving and projecting images recorded in a microfilm held in one of a plurality of cartridges accommodated in a container detachable from a body of said image projecting apparatus, each of said plurality of cartridges being provided with identifying information to identify the cartridge, said method comprising the steps of:

mounting the container in the body of said image projecting apparatus, said container accommodating a plurality of cartridges;

imputting first information and second information into the image projecting apparatus, wherein said first information is for specifying a desired cartridge and said second information is for specifying a position of a desired image;

searching the desired cartridge by reading identifying information of the cartridges based on the first information; and retrieving and projecting the desired image from the microfilm in the searched cartridge based on the second information.

21. A method performed in an image projecting apparatus for retrieving and projecting images recorded in a microfilm held in one of a plurality of cartridges accommodated in a container detachable from a body of said image projecting apparatus, each of said plurality of cartridges being provided with identifying information on an outer surface thereof to identify the cartridge, said method comprising the steps of:

mounting the container in the body of said image projecting apparatus, said container accommodating a plurality of cartridges;

reading said identifying information on the outer surface of the cartridges;

displaying the identifying information read from the cartridges;

inputting into the image projecting apparatus retrieving information for use of retrieval of a desired image recorded in a microfilm held in one of the cartridges identified by the identifying information thereon; and retrieving and projecting the desired image from the microfilm held in the identified cartridge based on the retrieving information.

* * * * *